US012806649B2

(12) United States Patent
Pittro et al.

(10) Patent No.: US 12,806,649 B2
(45) Date of Patent: Nov. 24, 2026

(54) SPRAY WASHER NOZZLE

(71) Applicant: NIFCO AMERICA CORP., Canal Winchester, OH (US)

(72) Inventors: Collin S. Pittro, Gahanna, OH (US); William Russell Rhoades, Columbus, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 401 days.

(21) Appl. No.: 18/378,299

(22) Filed: Oct. 10, 2023

(65) Prior Publication Data

US 2025/0114814 A1 Apr. 10, 2025

(51) Int. Cl.

*B05B 15/65* (2018.01)
*B05B 1/08* (2006.01)
*B05B 1/10* (2006.01)

(52) U.S. Cl.

CPC ................ *B05B 15/65* (2018.02); *B05B 1/08* (2013.01); *B05B 1/10* (2013.01)

(58) Field of Classification Search

CPC ........... B05B 1/10; B05B 1/185; B05B 15/65; B05B 1/08; B60S 1/46; B60S 1/48; B60S 1/52

USPC ..... 239/284.1, 589, 596, 600, 589.1, DIG. 3

See application file for complete search history.

(56) References Cited

U.S. PATENT DOCUMENTS

| | | | | |
|---|---|---|---|---|
| 4,438,884 A * | 3/1984 | O'Brien | B05B 15/65 | 239/600 |
| 6,244,527 B1 * | 6/2001 | Ferrazza | B05B 15/65 | 239/600 |
| 7,036,749 B1 * | 5/2006 | Steerman | B05B 1/08 | 239/284.1 |
| 9,027,860 B2 * | 5/2015 | Morgan | B05B 1/3426 | 239/596 |
| 2008/0142619 A1 * | 6/2008 | Kim | B60S 1/52 | 239/284.1 |
| 2014/0048630 A1 * | 2/2014 | Morgan | B05B 1/3006 | 239/589 |

* cited by examiner

*Primary Examiner* — Steven J Ganey
(74) *Attorney, Agent, or Firm* — HAUPTMAN HAM, LLP

(57) ABSTRACT

A spray washer nozzle includes an upper housing; a lower housing including a head assembled with the upper housing and a nozzle body extending downwardly from the head, the nozzle body having a fluid channel extending therethrough, and retaining clips configured to attach the lower housing to a portion to be installed; a fastening device having fastening clips formed on one the upper housing or the head of the lower housing and retaining members formed in another of the upper housing or the lower housing and engaging the fastening clips to connect the upper and lower housings together; a nozzle portion arranged in the upper housing and having a plurality of fluid chambers and a fluid exit to spray the fluid passing through the fluid channel and the fluid chambers from the fluid exit; and a seal arranged between the upper housing and the lower housing to seal therebetween.

13 Claims, 40 Drawing Sheets

SPRAY WASHER NOZZLE

FIELD OF THE INVENTION

The present invention relates to a spray washer nozzle for a vehicle, and more particularly to a spray washer nozzle in which a spray nozzle is integrally formed with a two-piece clam style housing, thereby simplifying the manufacturing process, reducing assembly time, and improving the overall spray performance.

BACKGROUND OF THE INVENTION

A spray washer nozzle for a vehicle should be able to be assembled in a simple and timely manner. Various types of washer nozzles have been developed using a one-piece housing that requires small components to be pressed into location during the assembly process. These types of designs are good for creating a sealed housing but are time consuming to assemble due to handling very small parts that have to be pressed into the housing with mechanical presses.

This two-piece clam shell design eliminates the small parts that must be pressed into the housing reducing component handling and assembly times for faster production processes.

SUMMARY OF THE INVENTION

The present invention has been made in an effort to provide a spray washer nozzle which has low manufacturing costs and can spray a cleansing solution uniformly in a wide range so as to enhance the overall cleaning performance.

In one aspect of the invention, a spray washer nozzle of the invention comprises an upper housing; a lower housing including a head assembled with the upper housing and a nozzle body extending downwardly from the head, the nozzle body having a fluid channel extending therethrough to supply fluid to the upper housing, and retaining clips configured to attach the lower housing to a portion to be installed; a fastening device having fastening clips formed on one the upper housing or the head of the lower housing, and retaining members formed in another of the upper housing or the lower housing and engaging the fastening clips to connect the upper and lower housings together; a nozzle portion arranged in the upper housing and having a plurality of fluid chambers and a fluid exit to spray the fluid passing through the fluid channel and the fluid chambers from the fluid exit; and a seal arranged between the upper housing and the lower housing to seal therebetween.

In the spray washer nozzle of the invention, the seal has a horseshoe shape with an open end to surround the nozzle portion with the fluid exit at the open end.

In the spray washer nozzle of the invention, the nozzle portion is integrally formed in a bottom portion of the upper housing, and a sealing rib as a part of the seal surrounds the fluid chambers and the fluid exit.

In this respect, the upper housing further includes a locator pin, and the lower housing further includes a locator slot engaging the locator pin when the upper and lower housings are aligned.

In another aspect of the invention, the upper housing includes a side wall extending downwardly from a periphery of the upper housing, the side wall includes the fastening clips each having a flexibility and a clip pocket therein, and the lower housing includes locator tabs each engaging the clip pocket when the upper housing is assembled with the lower housing.

In the spray nozzle of the invention, the lower housing further includes a seal flange with a seal extrusion therearound, the side wall covering the seal disposed around the seal extrusion, and another locator tab disposed on the seal flange to locate the upper housing.

In the spray nozzle of the invention, the nozzle portion is integrally formed in a lower surface of the upper housing.

In a further aspect of the invention, the nozzle portion is formed separately from the upper housing and the lower housing, and includes a nozzle tube and a nozzle socket, the upper housing having a notch so that the nozzle portion is disposed above the lower housing and placed in the notch.

In a still further aspect of the invention, the nozzle portion is formed separately from the upper housing, the upper housing having an upper notch, and the lower housing having a lower notch facing the upper notch, the nozzle portion being located in the upper notch and the lower notch.

In the spray washer nozzle of the invention, the nozzle portion includes a body having the plurality of fluid chambers and the fluid exit, and a socket attached to the body.

It is to be understood that the term “vehicle” as used herein is inclusive of motor vehicles in general such as passenger automobiles including sports utility vehicles (SUV), buses, trucks, various commercial vehicles, watercraft including a variety of boats and ships, aircraft, and the like. The present spray washer nozzles will be particularly useful with a wide variety of motor vehicles.

DETAILED DESCRIPTION OF THE INVENTION

The following detailed description is exemplary in nature and is not intended to limit the application and uses. Furthermore, there is no intention to be bound by any theory presented by the following detail.

Figure 1:
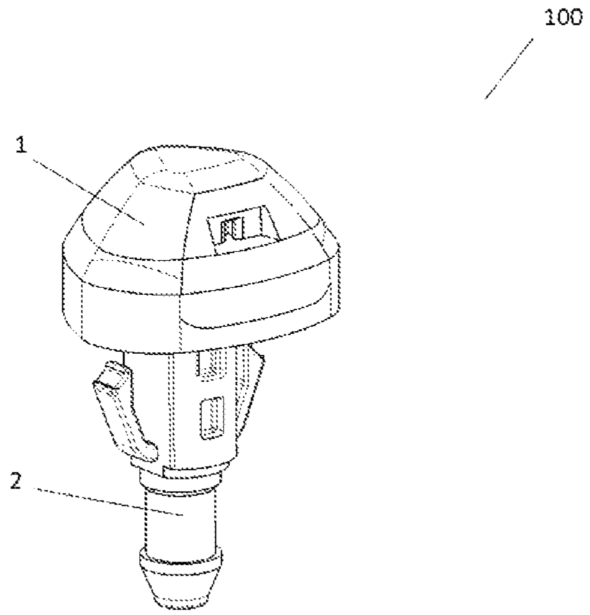
FIG. 1 shows an isometric view of a spray washer nozzle.
Figure 2:
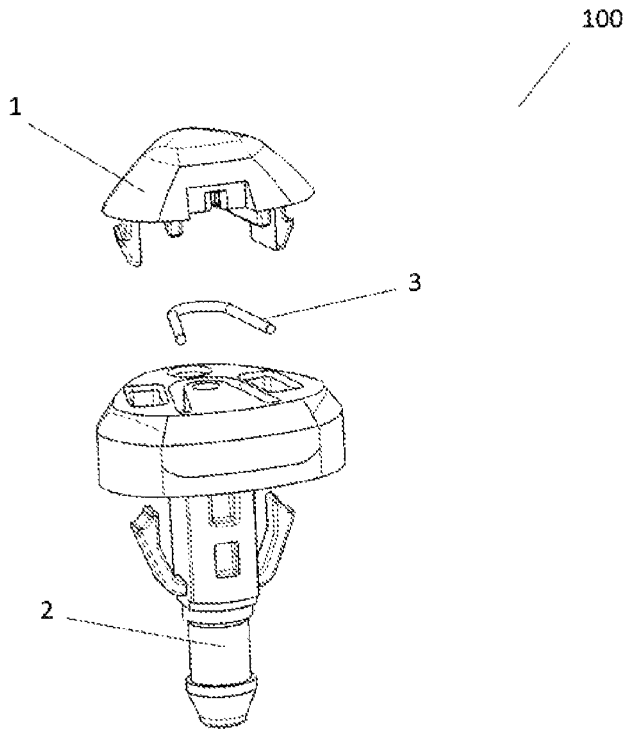
FIG. 2 shows an exploded isometric view of the spray washer nozzle.

FIG. 1 and FIG. 2 show a spray washer nozzle 100 which comprises an upper housing 1, a lower housing 2, and a seal 3 that is located between them.

Figure 3:
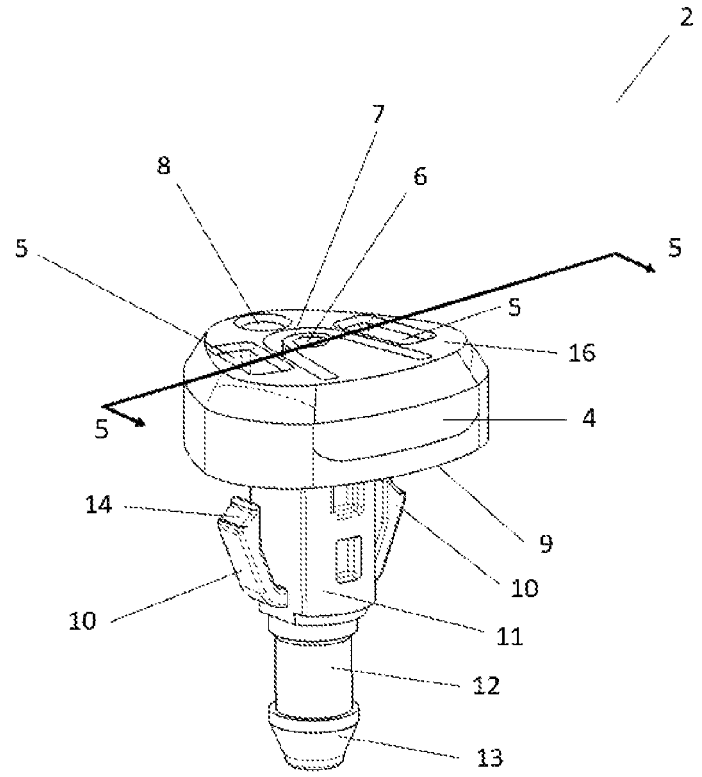
FIG. 3 shows an isometric view of a lower housing.
Figure 4:
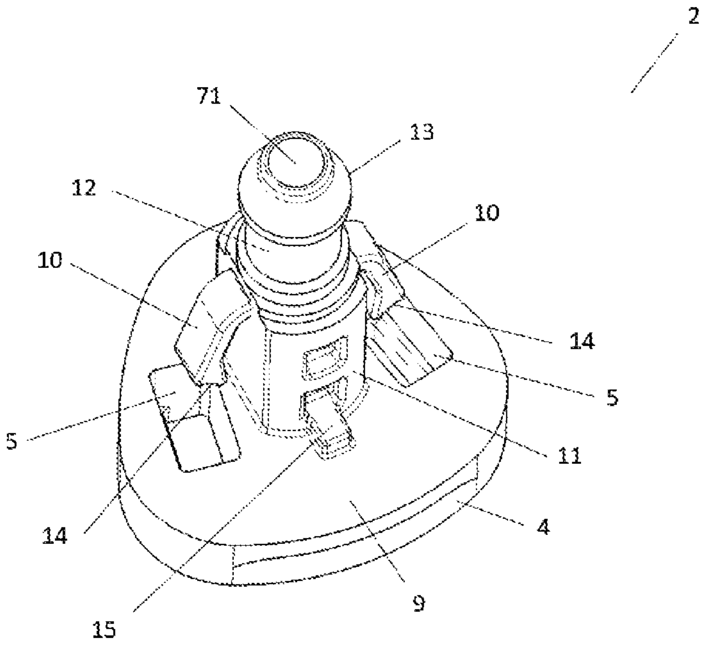
FIG. 4 shows a bottom isometric view of the lower housing.
Figure 5:
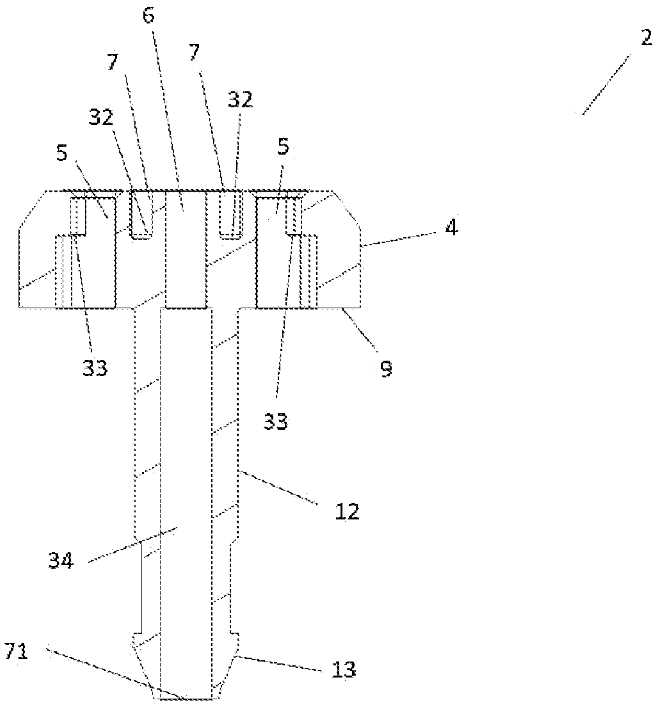
FIG. 5 shows a cross section view taken along line 5-5 in FIG. 3.

FIG. 3 thru FIG. 5 show the lower housing 2, which is a one-piece construction comprising a head 4 and a nozzle body 11.

The oblong shaped head 4 has a top surface 16 and a bottom surface 9. The top surface 16 has clip retaining slots 5 near the outer edge of the long ends of the head 4 that run through it. The size of the slot reduces on the outer side as the retaining clip slot 5 runs from the bottom surface 9 up to the top surface 16 creating a retention surface 33 in the middle of the head 4. A locator slot 8 is placed between the retaining clip slots 5 near the edge of the head 4, and does not extend thru the bottom surface 9. A fluid port 6 is located in the center of the head 4 that feeds fluid from the nozzle body 11 to the head 4. A seal slot 7 has a horseshoe shape, and is placed around the outside of the fluid port 6 and on the inside of the clip retaining slot 5 and the locator slot 8 with the open end of the horseshoe shape facing away from the locator slot 8.

Figure 14:
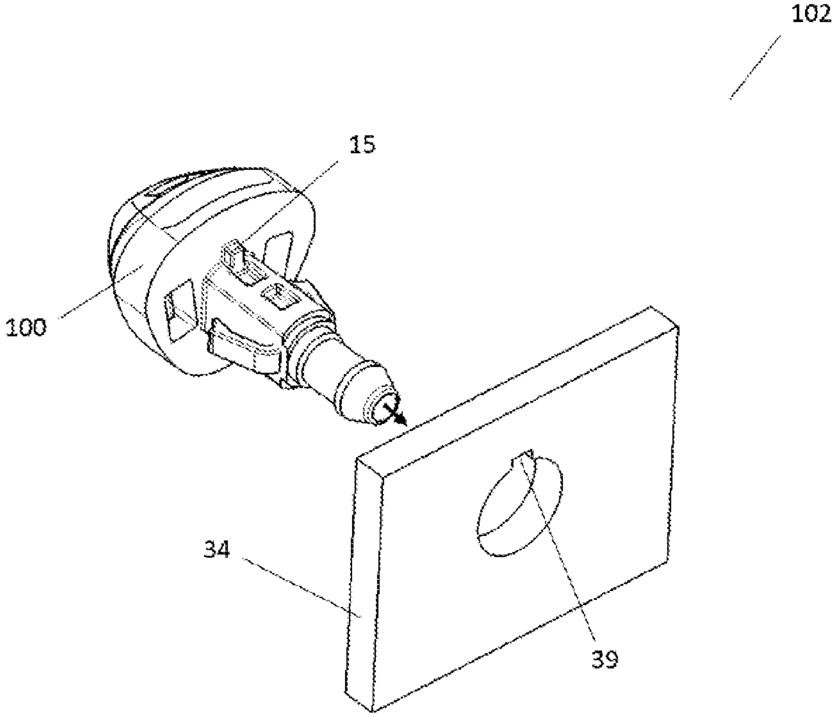
FIG. 14 shows an exploded view of the spray nozzle installation.
Figure 15A:
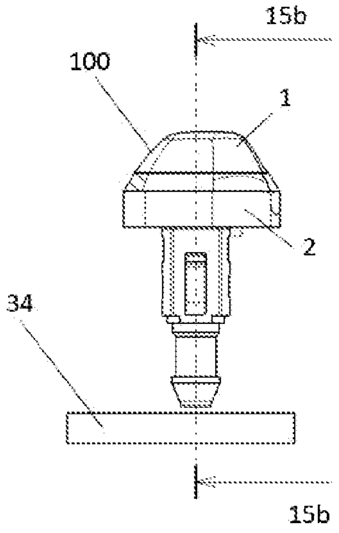
FIG. 15(*a*) shows a right side view of the spray washer nozzle installation, and FIG. 15(*b*) is a section view taken along line 15(*b*)-15(*b*) in FIG. 15(*a*).
Figure 15B:
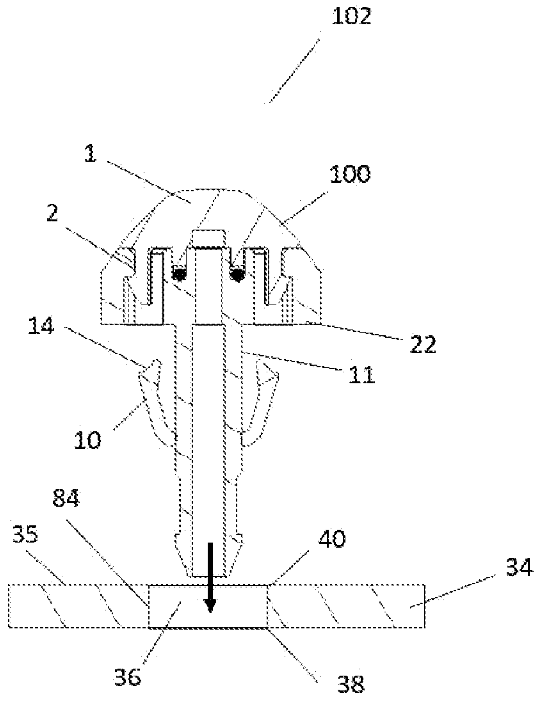
Figure 16A:
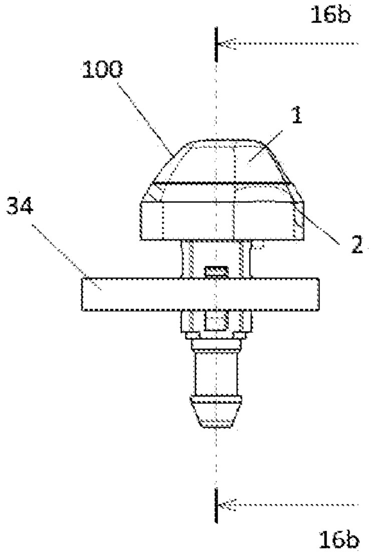
FIG. 16(*a*) shows a right side view of a spray washer nozzle housing installation, and FIG. 16(*b*) is a section view taken along line 16(*b*)-16(*b*) in FIG. 16(*a*).
Figure 16B:
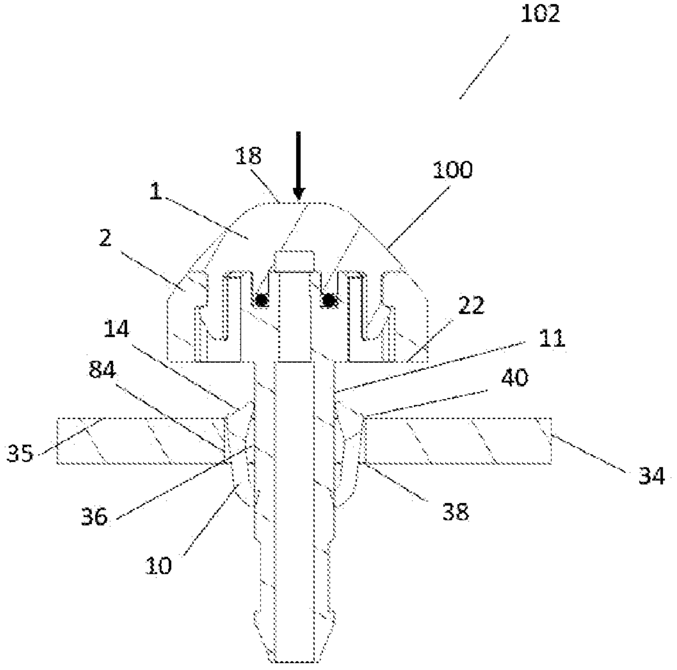
Figure 17A:
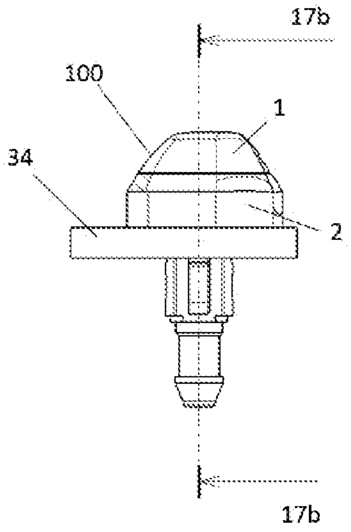
FIG. 17(*a*) shows a right-side view of the spray washer nozzle installation, and FIG. 17(*b*) is a section view taken along line 17(*b*)-1 (*b*) in FIG. 17(*a*).
Figure 17B:
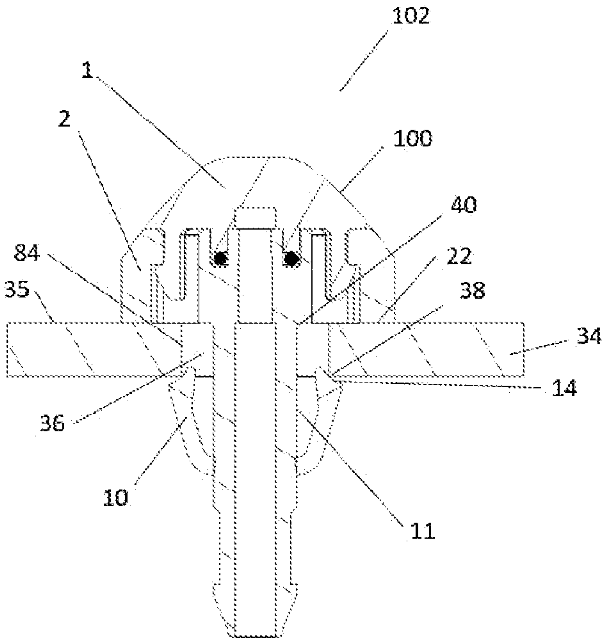
Figure 18:
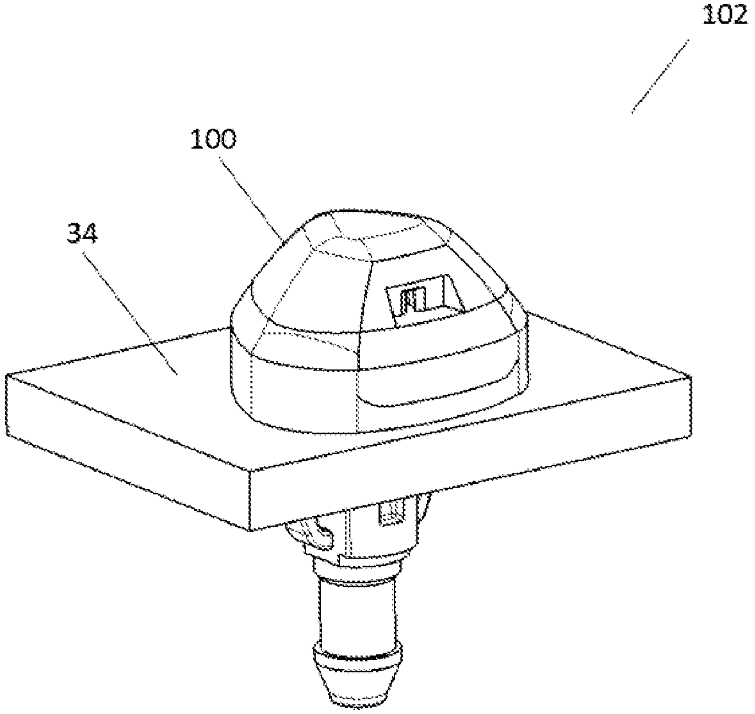
FIG. 18 shows an isometric view of the spray washer nozzle installation.
Figure 19:
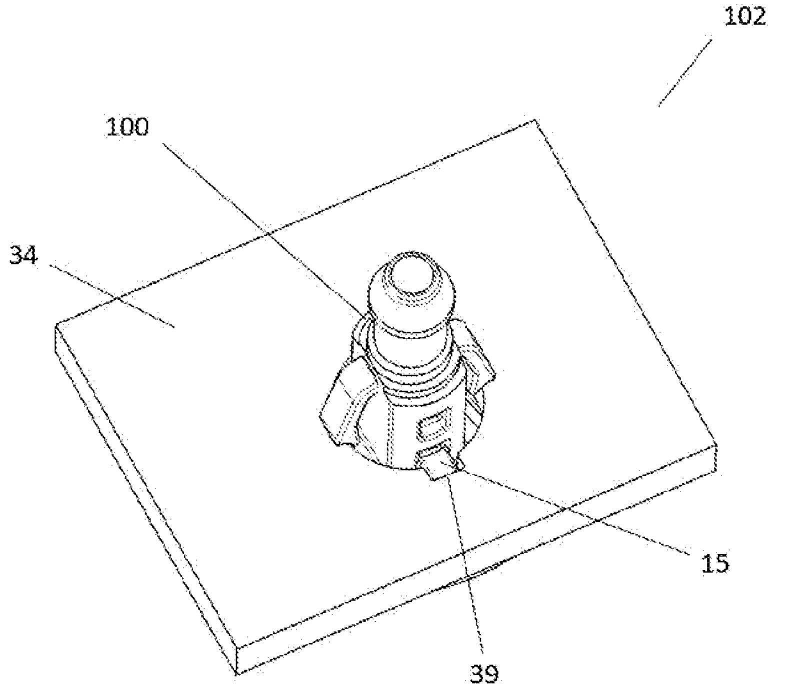
FIG. 19 shows a bottom isometric view of the spray washer nozzle installation.

The nozzle body 11 is a circular shaped tube that extends downward from the bottom surface 9 of the head 4. Flexible retaining clips 10 protrude outward and upward from the center of the nozzle body 11 at the opposite end of the head 4 with a wedge-shaped end with a tapered surface 14 facing away from the nozzle body 11. A circular shaped fluid tube 12 with an inner fluid channel 34 extends downward from the end of the nozzle body 11 just below the retaining clips 10 that is capped with a barbed end 13 containing the fluid inlet 71. Fluid can then travel from the fluid inlet 71 in the barbed end 13 through the fluid channel 34 and into the fluid port 6. An anti-rotational tab 15 (FIG. 14) extends down along the nozzle body 11 away from the bottom surface 9 of the head 4 perpendicular to the retaining clips 10.

Figure 6:
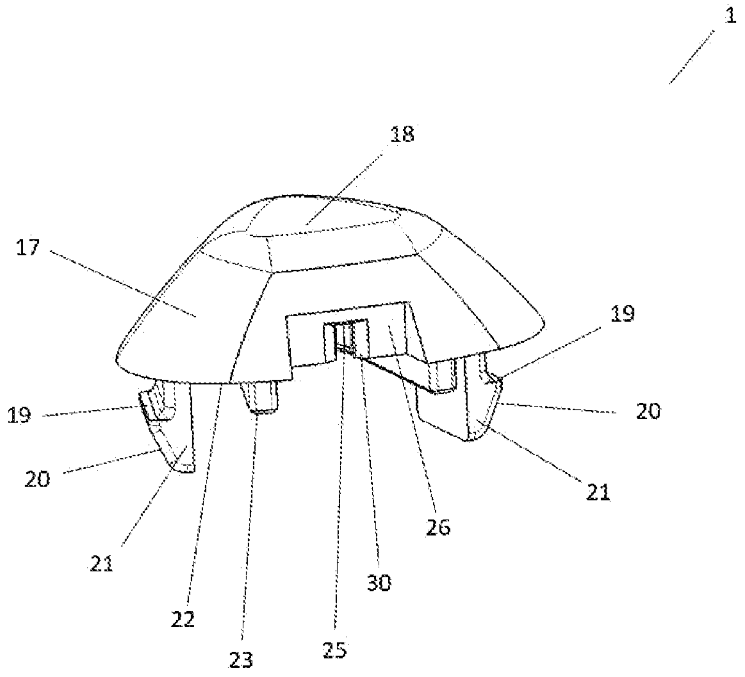
FIG. 6 shows an isometric view of an upper housing.
Figure 7:
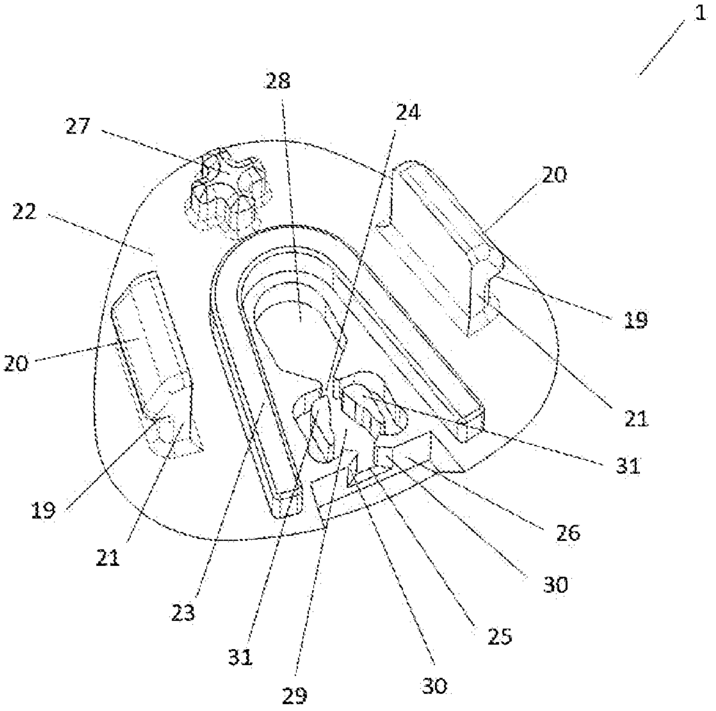
FIG. 7 shows a bottom isometric view of the upper housing.

FIG. 6 and FIG. 7 show the upper housing 1 which is oblong shaped with a flat bottom surface 22 that protrudes upward in a dome 17 with a flat top surface 18. Retaining clips 21 extend downward from the bottom surface 22 near the outer edge of the long ends of the oblong shape. Clip end of the retaining clip 21 is wedge shaped creating a tapered surface 20 on the outer side of the retaining clip 21 and a retaining surface 19 on the upper edge of the wedge shape.

A protruding locator pin 27 is placed between the retaining clips 21 near the edge of the bottom surface 22. A primary fluid chamber 28 is located in the center of the bottom surface 22 between the retaining clips 21. A secondary fluid chamber 29 is located in parallel to the primary fluid chamber 28 on the opposite side of the locator pin 27. The primary fluid chamber 28 and the secondary fluid chamber 29 are connected with a fluid channel 24 that is much smaller than the primary fluid chamber 28 and the secondary fluid chamber 29. Fluid control tabs 31 are placed in the secondary fluid chamber 29 to direct the flow of the fluid. A nozzle face 26 is placed along the opposite edge as the locator pin 27 on the bottom surface 22 in parallel with the primary fluid chamber 28 and secondary fluid chamber 29. The nozzle face 26 and the secondary fluid chamber 29 are connected with a fluid exit port 25 that is much smaller than the secondary fluid chamber 29 and the nozzle face 26.

Angled spray guides 30 run along the edges of the fluid exit port 25 on the nozzle face 26 to guide the fluid to its target. The seal rib 23 extends down from the bottom surface 22 encompassing the primary fluid chamber 28, the secondary fluid chamber 29 and the nozzle surface 26 in a horseshoe shape with an opening of the horseshoe on both sides of the nozzle face 26.

Figure 8A:
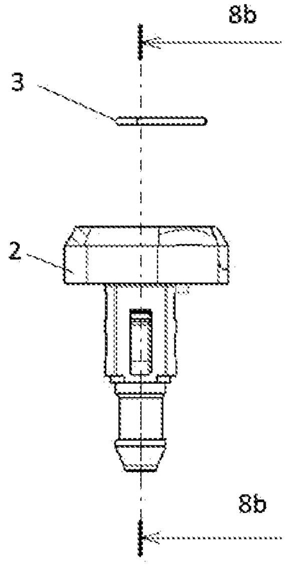
FIG. 8(*a*) shows a right-side view of a seal installation, and FIG. 8(*b*) is a section view taken along line 8(*b*)-8(*b*) in FIG. 8(*a*).
Figure 8B:
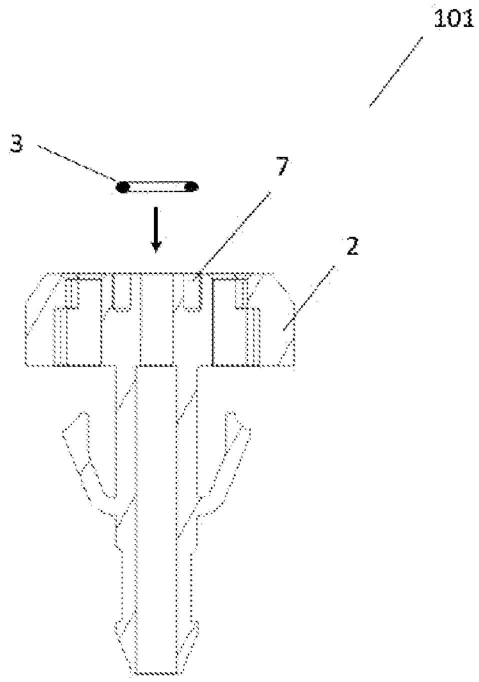
Figure 9A:
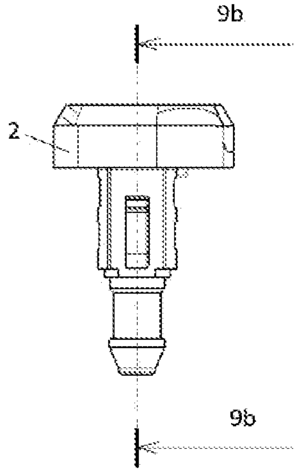
FIG. 9(*a*) shows a right-side view of the seal installation, and FIG. 9(*b*) is a section view taken along line 9(*b*)-9(*b*) in FIG. 9(*a*).
Figure 9B:
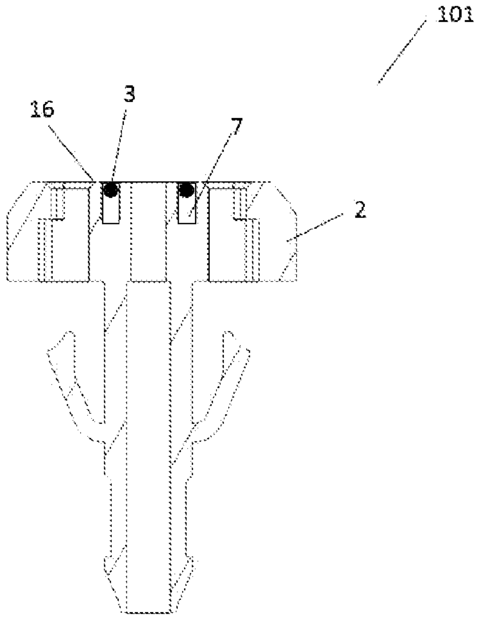

FIGS. 8(*a*), 8(*b*), 9(*a*) and 9(*b*) show the process for a seal installation 101. The seal 3 is placed into the seal slot 7 in the lower housing 2. Next, the seal 3 is pressed in the lower housing 2 until it is flush with the top surface 16 of the lower Housing 2.

Figure 10:
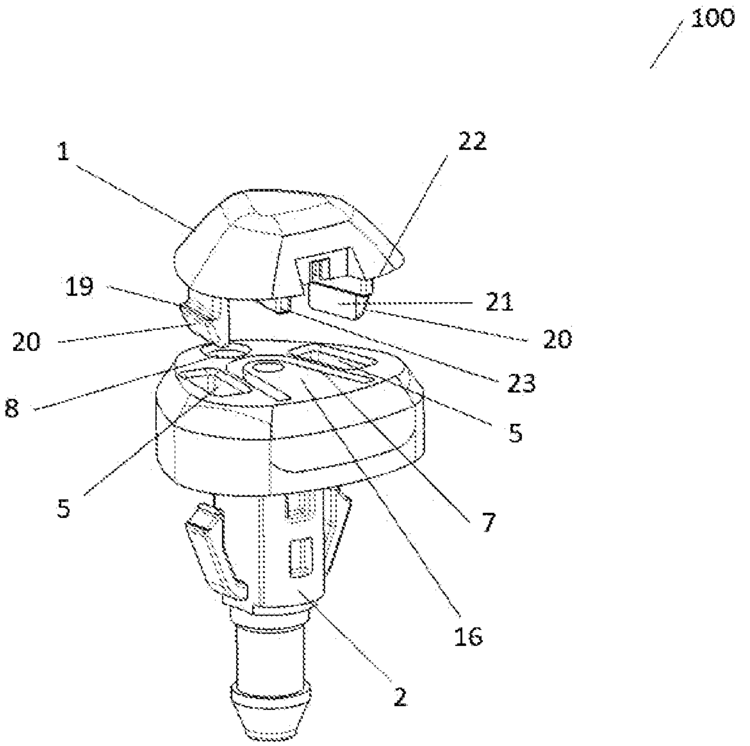
FIG. 10 shows an exploded isometric view of the spray washer nozzle.
Figure 11A:
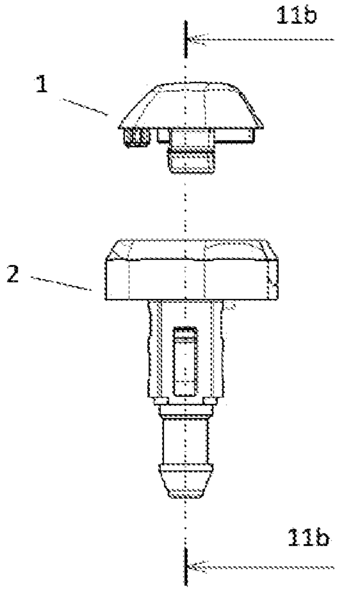
FIG. 11(*a*) shows a right side view of a washer nozzle, and FIG. 11(*b*) is a section view taken along line 9(*b*)-9(*b*) in FIG. 9(*a*).
Figure 11B:
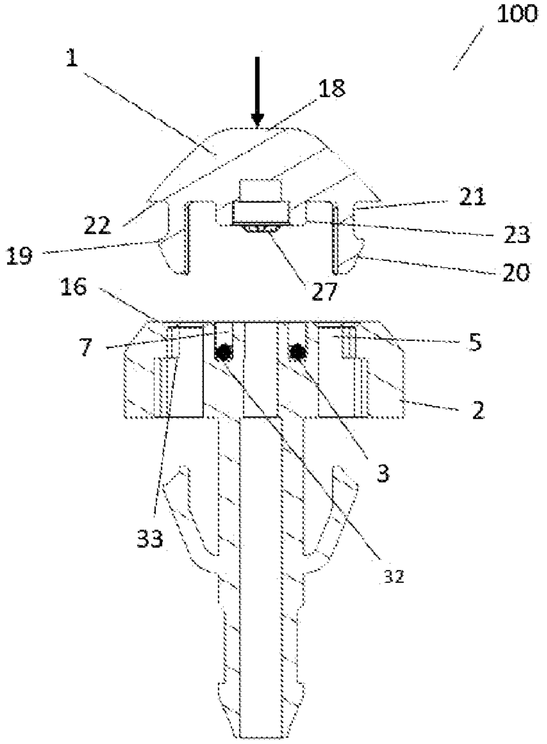
Figure 12A:
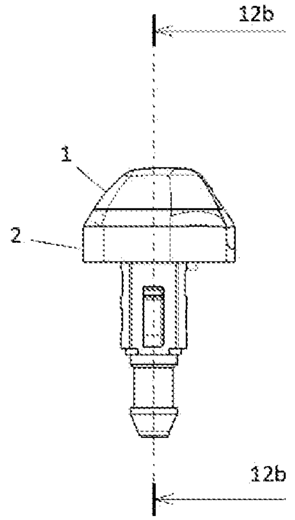
FIG. 12(*a*) shows a right side view of the spray washer nozzle, and FIG. 12(*b*) is a section view taken along line 12(*b*)-12(*b*) in FIG. 12(*a*).
Figure 12B:
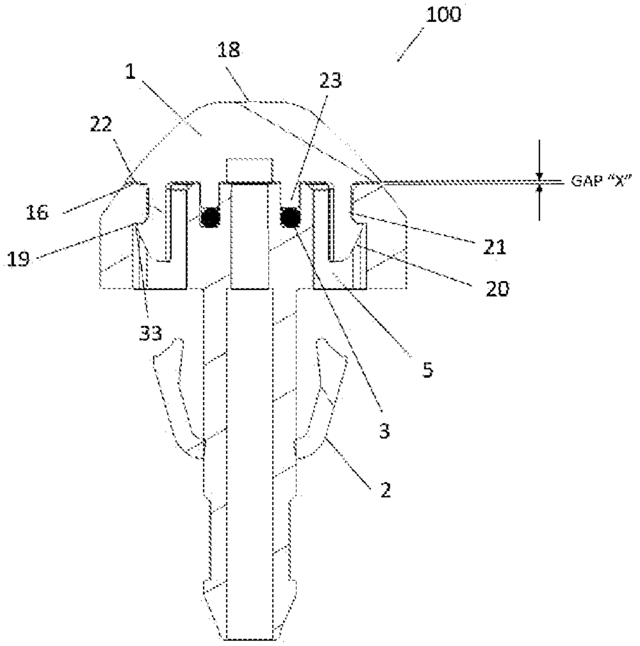

FIG. 10 thru FIG. 12(*b*) show the assembly of the spray washer nozzle 100. The retaining clips 21 on the upper housing 1 are placed into the clip retaining slots 5 in the lower housing 2 with the locator pin 27 of the upper housing 1 aligned with the locator slot 8 in the lower housing 2. Next pressure is applied to the top surface 18 on the upper housing 1 forcing the retaining clips 21 into the clip retaining slots 5 in the lower housing 2. The tapered surfaces 20 at the end of the retaining clip 21 flex inward to conform to the small size of the clip retaining slots 5 until the tapered surfaces 20 move past the retention surfaces 33 in the center of the retaining clip slots 5 at which time the retaining clips 21 flex back to their original position catching the retaining surfaces 19 of the retaining clips 21 under the retention surface 33 of the lower housing 2.

Simultaneously, as the force is applied to the top surface 18 of the upper housing 1, the seal rib 23 on the bottom surface 22 of the upper housing 1 contacts the surface of the seal 3, pressing it farther down into the seal slot 7 until the seal 3 contacts the seal surface 32 at the bottom of the seal slot 7 compressing it between the upper housing 1 and the lower housing 2. This seals the bottom surface 22 of the upper housing 1 and the top surface 16 of the lower housing 2 creating a fluid tight seal around the fluid port 6. A small gap "x" is maintained between the upper housing 1 and the lower housing 2 where the seal 3 is compressed.

Figure 13:
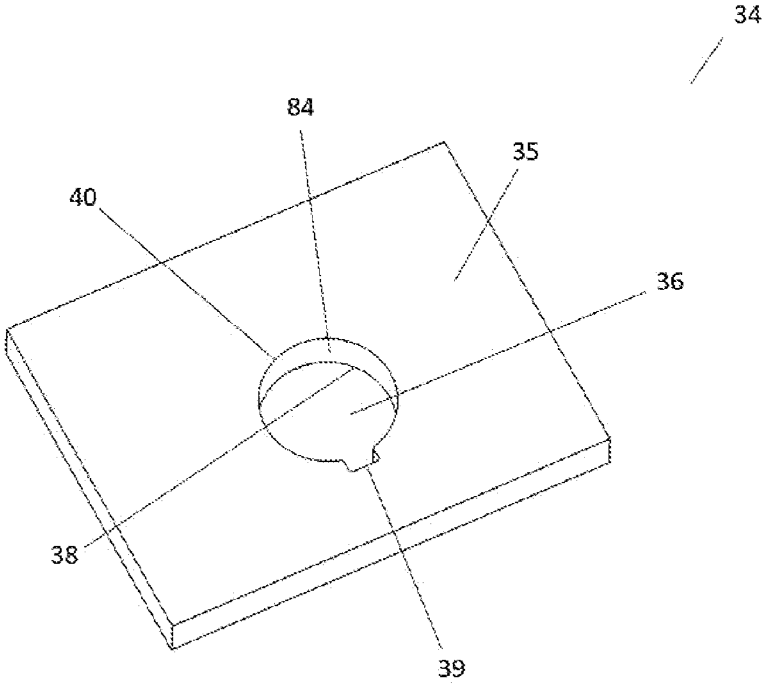
FIG. 13 shows an isometric view of a vehicle panel.

FIG. 13 shows a section of a vehicle panel 34. The vehicle panel 34 includes a center hole 36 with an anti-rotational notch 39 located around the upper edge 40.

FIG. 14 thru FIG. 19 show the process of the spray washer nozzle installation. The nozzle body 11 of the spray washer nozzle 100 is placed into the hole 36 of the vehicle panel 34. Pressure is applied to the top surface 18 of the upper housing 1 forcing the retaining clips 10 through the hole 36. The retaining clips 10 are flexed inward by the upper edge 40 of the of hole 36 allowing the nozzle body 11 to pass through the inside surface 84 of hole 36 in the vehicle panel 34.

When the bottom surface 22 of the upper housing 1 contacts the top surface 35 of the vehicle panel 34, the retaining clips 10 flex back to their original position catching the tapered surfaces 14 on the bottom edge 38 of hole 36 retaining the spray washer nozzle 100 to the vehicle panel 34. While pushing the spray washer nozzle 100 through the hole 36 in the vehicle panel 34, the anti-rotation tab 15 on the spray washer nozzle 100 must be aligned with the anti-rotation notch 39 in the vehicle panel 34. This keeps the spray washer nozzle 100 from rotating in the vehicle panel 34 maintaining the fluid flow at its intended target.

Figure 20:
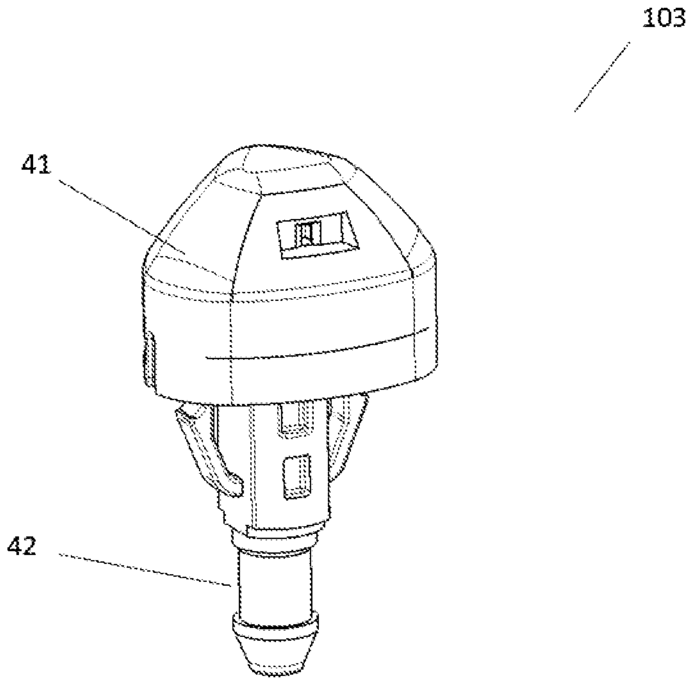
FIG. 20 shows an isometric view of the spray washer nozzle.
Figure 21:
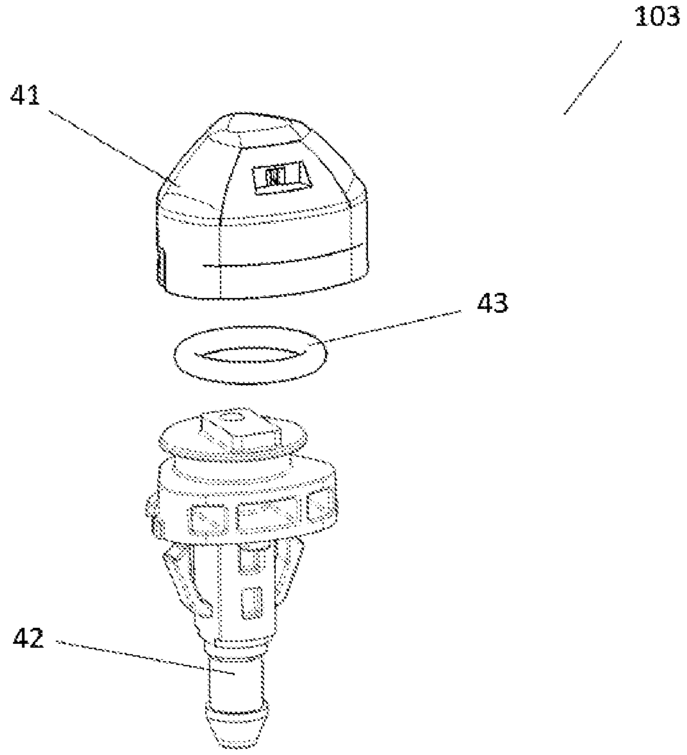
FIG. 21 shows an exploded isometric view of another spray washer nozzle.

FIG. 20 and FIG. 21 show another spray washer nozzle 103 which comprises a upper housing 41, a lower housing 42 and a seal 43 that is located between them.

Figure 22:
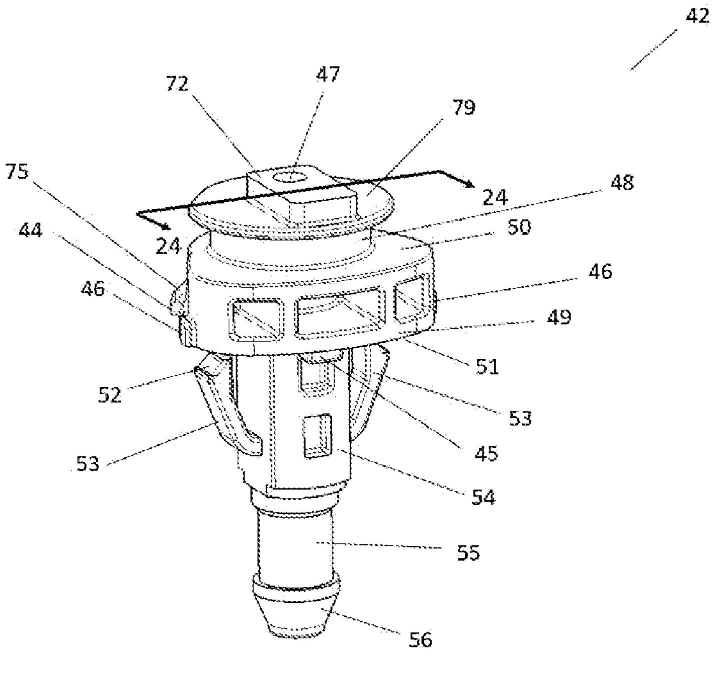
FIG. 22 shows an isometric view of the lower housing.
Figure 23:
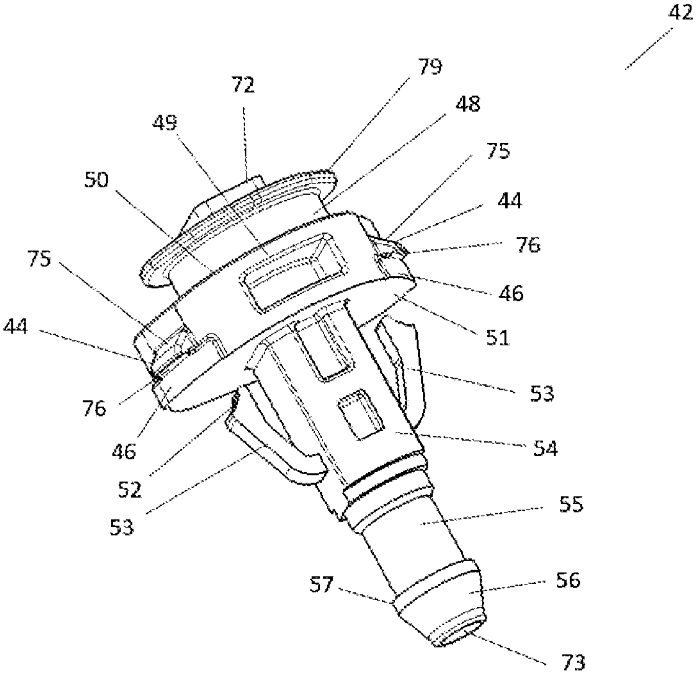
FIG. 23 shows an isometric view of the lower housing.
Figure 24:
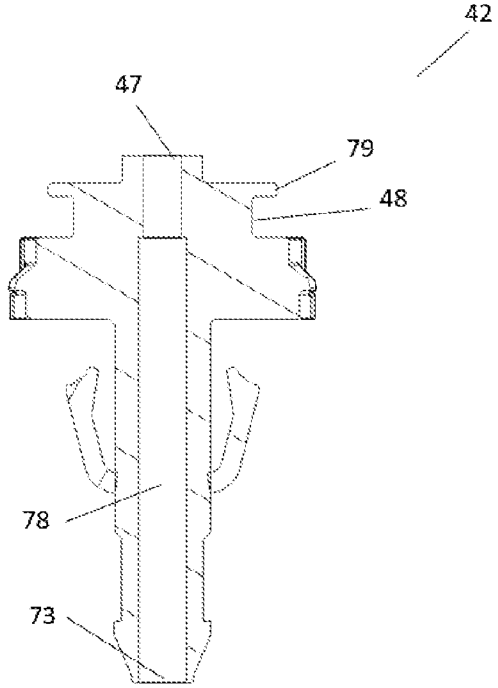
FIG. 24 shows a cross section view taken along line 24-24 in FIG. 22.

FIG. 22 through FIG. 24 show the lower housing 42 which is a one-piece construction that is formed of two main parts, i.e. a head 49 and a nozzle body 54.

The oblong shaped head 49 has a top surface 50 and a bottom surface 51. A circular seal extrusion 48 extends upward from the top surface 50 with a large diameter circular seal flange 79. A rectangular shaped locator tab 72 extends upward from the seal flange 79 with a fluid port 47 running through the locator tab 72 down through the head 49. Locator tabs 46 are placed on the long ends on the oblong shaped head 49 extending upward from the bottom surface 51 but not extending to the top surface 50 of the head 49. Wedge shaped retaining tabs 44 are located beside the locator tabs 46 protruding out from the center of the head 49 between the top surface 50 and the bottom surface 51. A flat retaining surface 76 of the wedge shape is located on the bottom surface 51 side of the head 49. The wedge shape of the retaining tab 44 extends towards the top surface 50 side of the head 49 creating tapered surface 75.

A nozzle body 54 is a circular shaped tube that extrudes downward from the bottom surface 51 of the head 49. Flexible retaining clips 53 protrude outward and upward from the center of the nozzle body 54 at the opposite end of the head 49. A circular shaped fluid tube 55 with an inner fluid channel 78 extends downward from the end of the nozzle body 54 just below the retaining clips 53 that is capped with a barbed end 56 containing the fluid inlet 73. Fluid can then travel from the fluid inlet 73 in the barbed end 56 through the fluid channel 78 and into the fluid port 47. An anti-rotational tab 45 extends down along the nozzle body 54 away from the bottom surface 51 of the head 49 perpendicular to the retaining clips 53.

Figure 25:
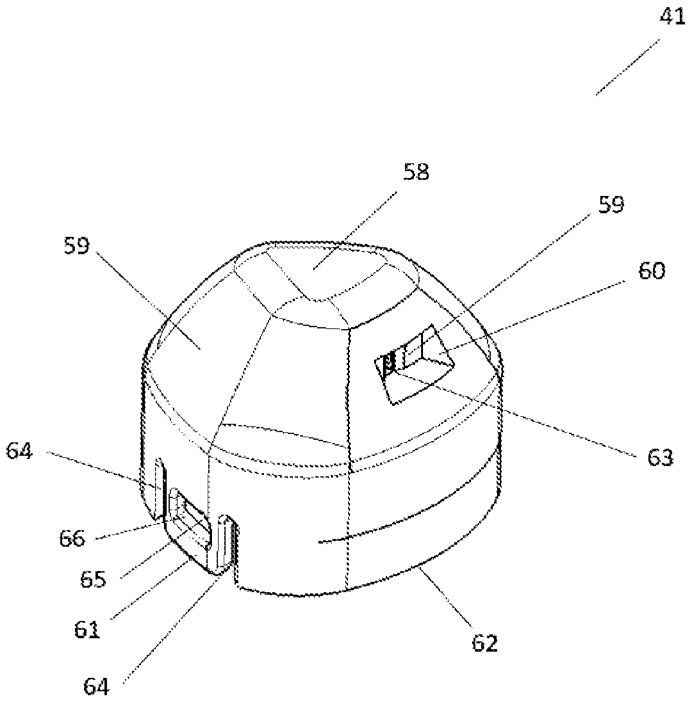
FIG. 25 shows an isometric view of the upper housing.
Figure 26:
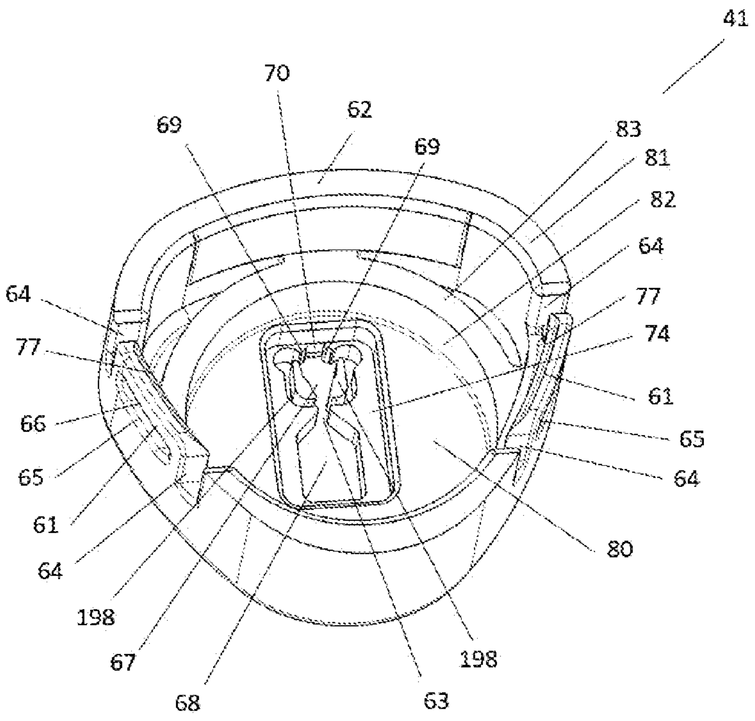
FIG. 26 shows a bottom isometric view of the upper housing.

FIG. 25 and FIG. 26 show the upper housing 41 which has an oblong shape with a flat bottom surface 62 that protrudes upward in a dome 59 shape with a flat top surface 58. The dome 59 is hollowed out with the bottom surface 62 exposed creating a base rib 81 around the circumference of the upper housing 41. A circular seal rib 83 extends downward from the inter surface 80 of the dome 59 creating a seal pocket 82. Retaining clips 61 are located in the base rib 81 on each end of the long end of the oblong shaped of the upper housing 41 with a clip pocket 65 in the center of each of the retaining clips 61. A pocket surface 66 is located in the clip pocket 65 on the opposite side of the tapered edges 77. The inner edge of the retaining clip 61 has a tapered edge 77. Flex slots 64 are placed on each side of the retaining clips 61 to allow the retaining clips 61 flex away from the seal rib 83.

A rectangular shape cut into a locating pocket 74 is located in the center of the inter surface 80 of the dome 59. A primary fluid chamber 68 is cut into the center of the locating pocket 74 between the retaining clips 61. A secondary fluid chamber 67 is located in parallel to the primary fluid chamber 68 on the long side of the oblong shaped upper housing 41. The primary fluid chamber 68 and the secondary fluid chamber 67 are connected with a fluid channel 63 that is much smaller than the primary fluid chamber 68 and the secondary fluid chamber 67. Fluid control tabs 198 are placed in the secondary fluid chamber 67 to direct the flow of the fluid. A nozzle pocket 60 is cut into the outer face of the dome 59 parallel with the primary fluid chamber 68 and the secondary fluid chamber 67. The nozzle pocket 60 and the secondary fluid chamber 67 are connected with a fluid exit port 70 that is much smaller than the secondary fluid chamber 67 and the nozzle pocket 60. Angled spray guides 69 extend along the edges of the fluid exit port 70 on the nozzle pocket 60 to guide the fluid to its target.

Figure 27A:
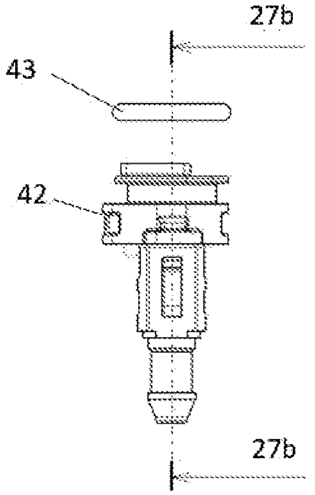
FIG. 27(*a*) shows a right-side view of the seal installation, and FIG. 27(*b*) is a section view taken along line 27(*b*)-27(*b*) in FIG. 27(*a*).
Figure 27B:
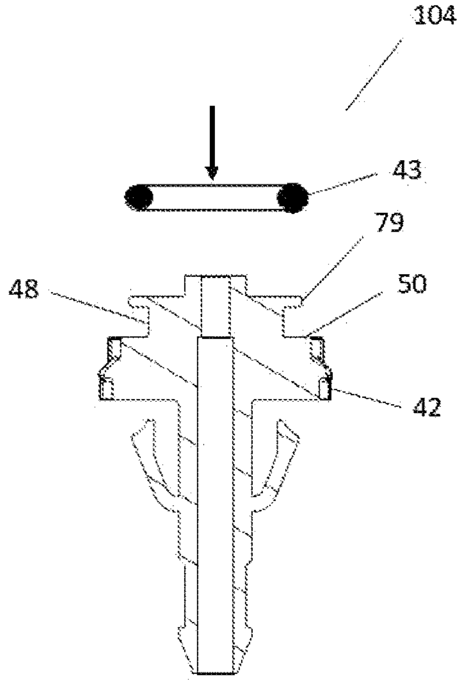
Figure 28A:
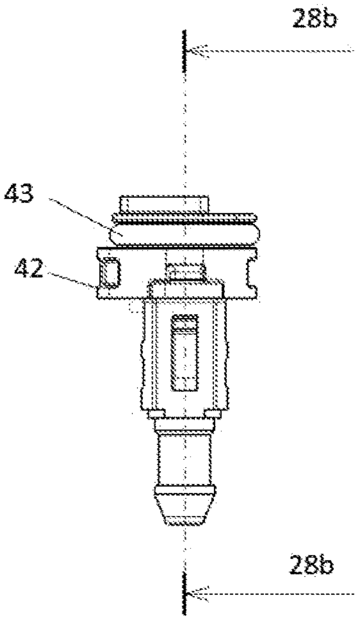
FIG. 28(*a*) shows a right-side view of the seal installation, and FIG. 28(*b*) is a section view taken along line 28(*b*)-28(*b*) in FIG. 28(*a*).
Figure 28B:
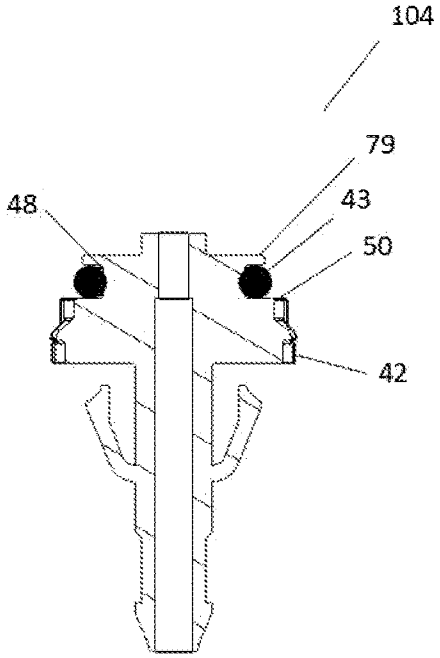

FIG. 27(*a*) to FIG. 28(*b*) show the process for a seal installation 104. The seal 43 is placed over the seal flange 79 of the lower housing 42 until it is seated in the seal extrusion 48 between the seal flange 79 and the top surface 50 in the lower housing 42.

Figure 29A:
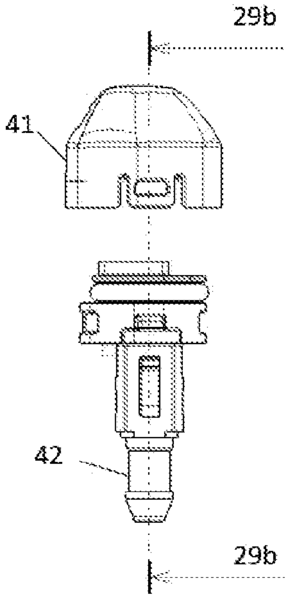
FIG. 29(*a*) shows an exploded right-side view of the spray washer nozzle, and FIG. 29(*b*) is a section view taken along line 29(*b*)-29(*b*) in FIG. 29(*a*).
Figure 29B:
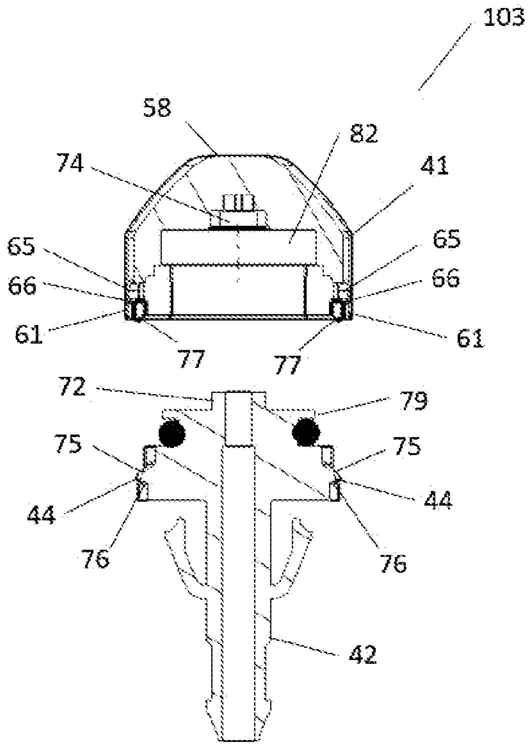
Figure 30A:
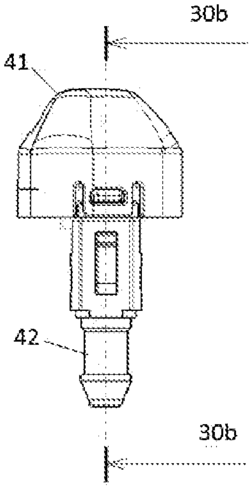
FIG. 30(*a*) shows a right-side view of the spray washer nozzle, and FIG. 30(*b*) is a section view taken along line 30(*b*)-30(*b*) in FIG. 30(*a*).
Figure 30B:
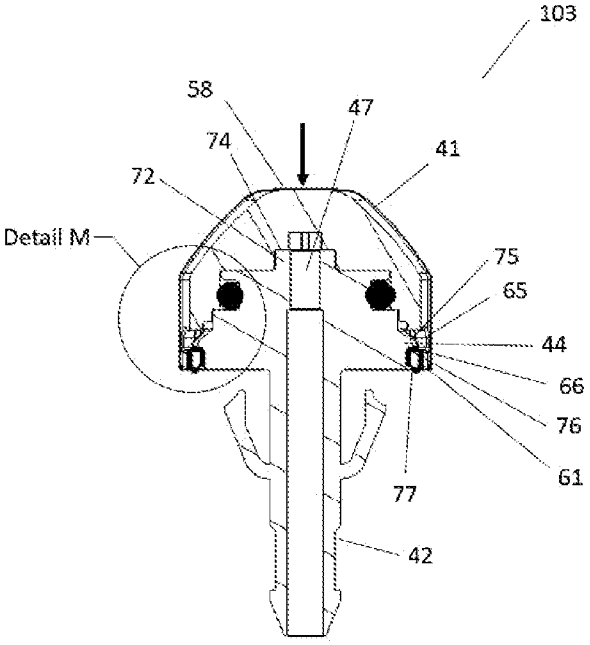
Figure 31:
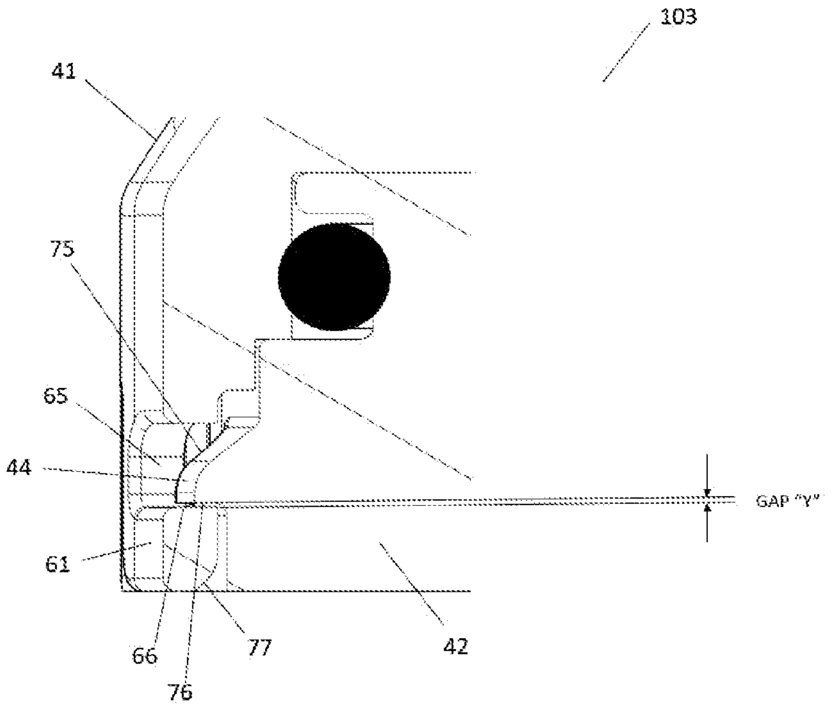
FIG. 31 shows a detailed view of the spray washer nozzle.
Figure 32:
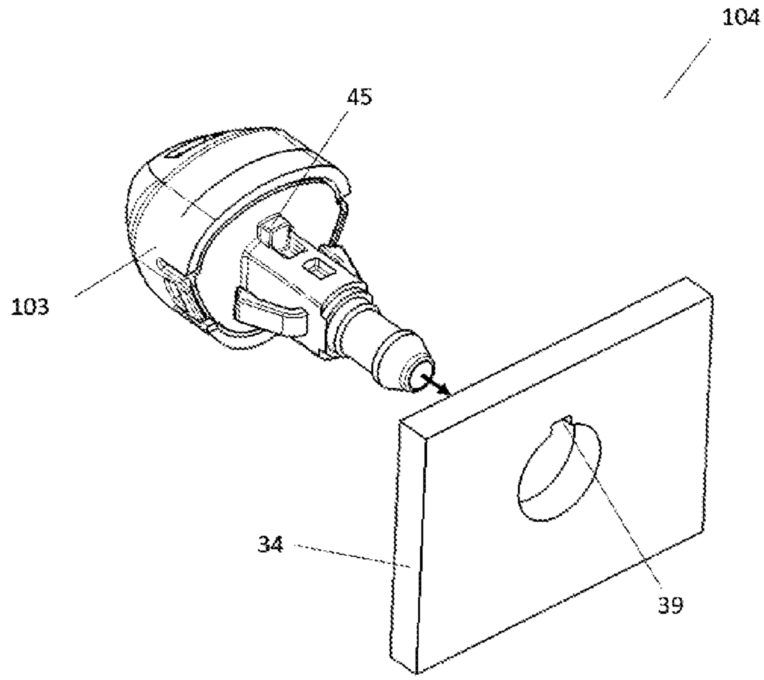
FIG. 32 shows an exploded isometric view of the spray washer nozzle installation.
Figure 33A:
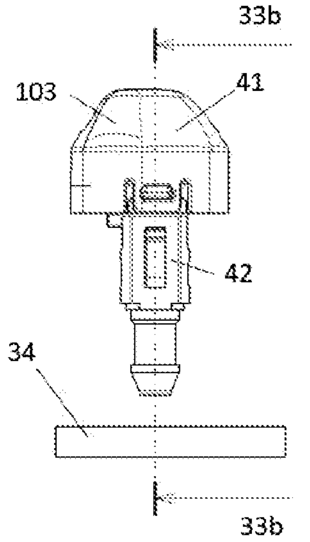
FIG. 33(*a*) shows an exploded right-side view of the spray washer nozzle installation, and FIG. 33(*b*) is a section view taken along line 33(*b*)-33(*b*) in FIG. 33(*a*).
Figure 33B:
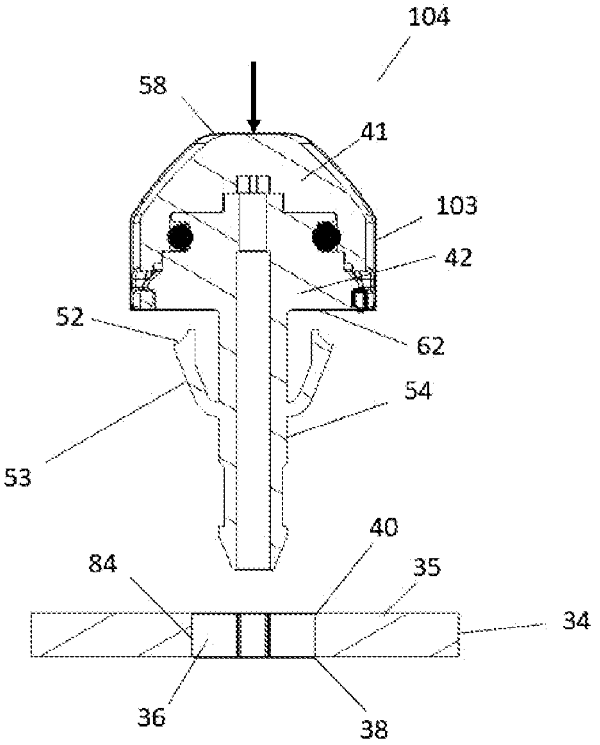
Figure 34A:
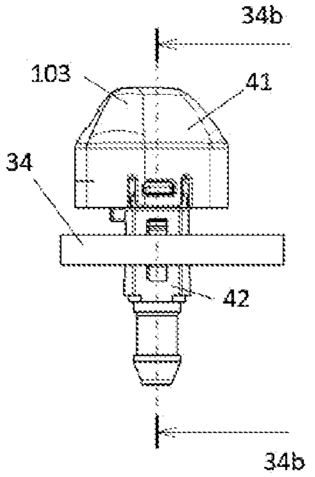
FIG. 34(*a*) shows an exploded right-side view of the spray washer nozzle installation, and FIG. 34(*b*) is a section view taken along line 34(*b*)-34(*b*) in FIG. 34(*a*).
Figure 34B:
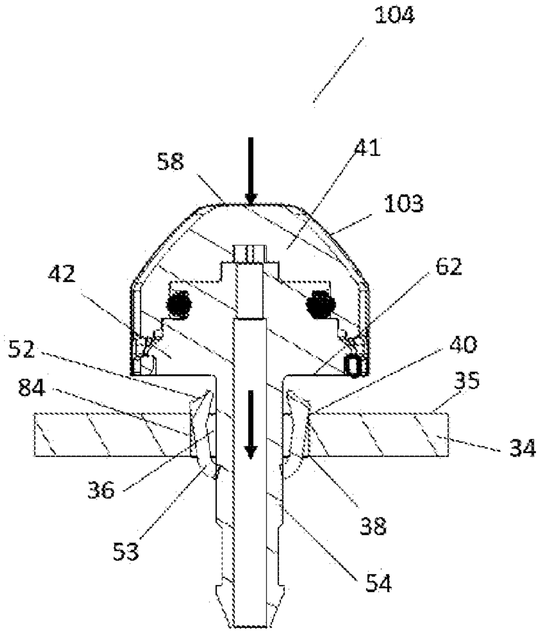
Figure 35A:
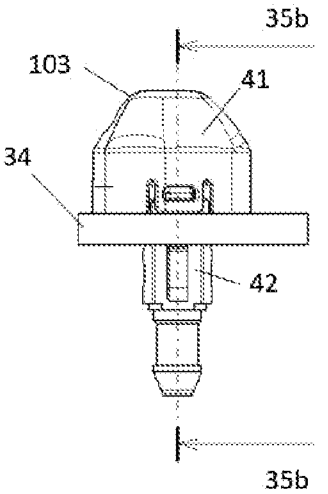
FIG. 35(*a*) shows a right-side view of the spray washer nozzle installation and FIG. 35(*b*) is a section view taken along line 35(*b*)-35(*b*) in FIG. 35(*a*).
Figure 35B:
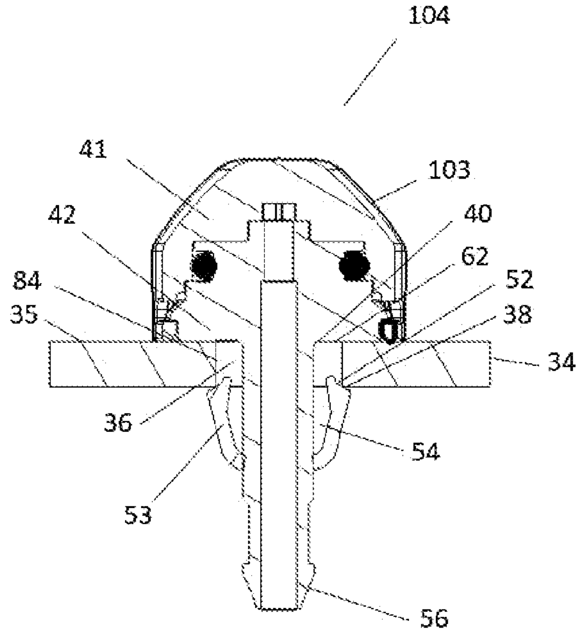
Figure 36:
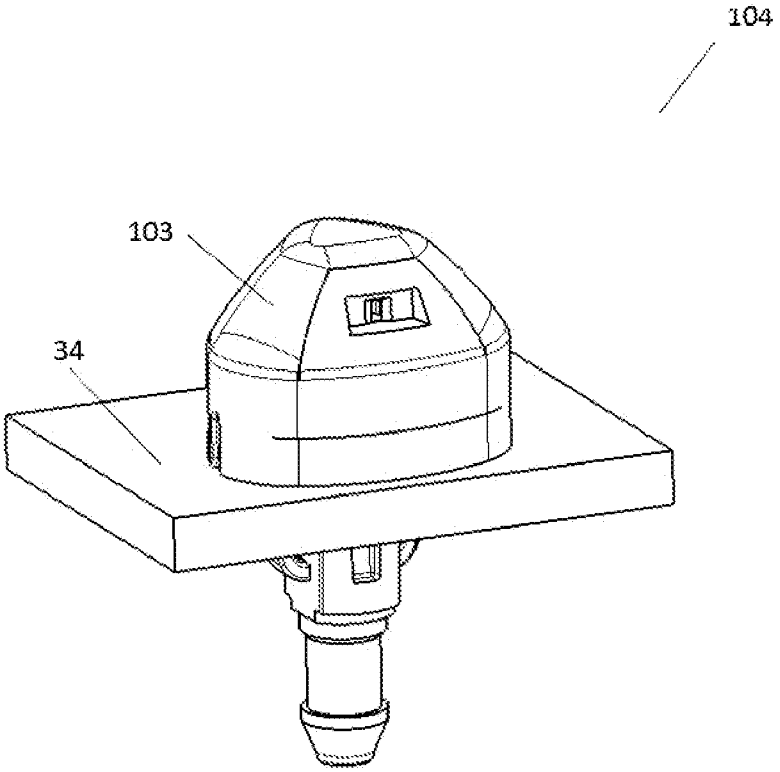
FIG. 36 shows an isometric view of the spray washer nozzle installation.
Figure 37:
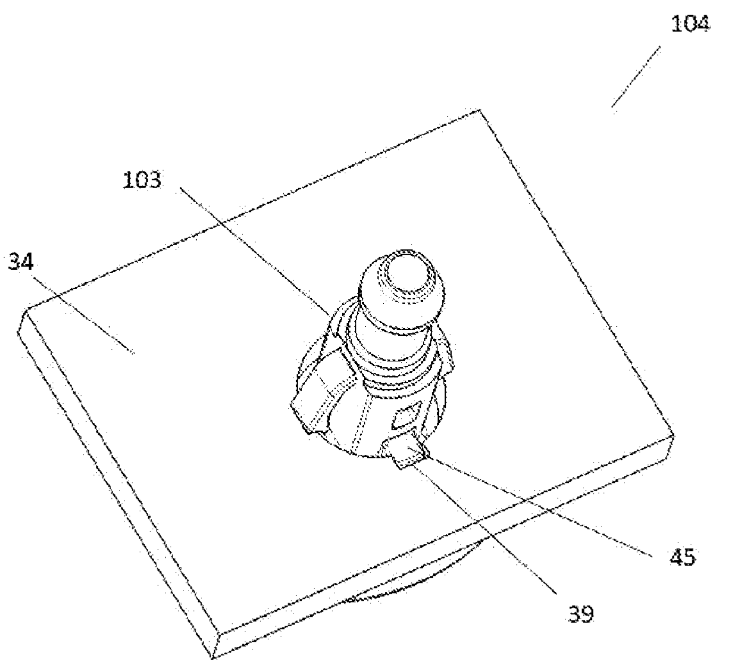
FIG. 37 shows a bottom isometric view of the spray washer nozzle installation.

FIG. 29(*a*) through FIG. 31 show the assembly of the spray washer nozzle 103. The upper housing 41 is placed over the lower housing 42 by locating the seal flange 79 of the lower housing 42 into the seal pocket 82 in the upper housing 41 while aligning the locator tab 72 with the locating pocket 74 in the upper housing 41. Applying pressure to the top surface 58 of the upper housing 41 will force the tapered edge 77 of the retaining clips 61 to flex outward along the tapered surfaces 75 of the retaining tabs 44 on the lower housing 42. Once the clip pockets 65 in the retaining clips 61 move past the retaining tabs 44, the retaining clips 61 will flex back to their original positions catching the pocket surfaces 66 of the clip pockets 65 under the retaining surfaces 76 of the retaining tabs 44 securing the upper housing 41 to the lower housing 42. This seals the upper housing 41 with the lower housing 42 creating a fluid tight seal around the fluid port 47. A small gap "Y" is maintained between the upper housing 1 and the lower housing 2 where the seal 3 is compressed.

FIG. 32 through FIG. 37 show the process of the spray washer nozzle installation 104. The nozzle body 54 of the lower housing 42 is placed into the hole 36 of the vehicle panel 34. Pressure is applied to the top surface 58 of the upper housing 41 forcing the retaining clips 53 through the hole 36. The retaining clips 53 are flex inward by the upper edge 40 of the of hole 36 allowing the nozzle body 54 to pass through the inside surface 84 of hole 36 in the vehicle panel 34. When the bottom surface 62 of the upper housing 41 contacts the top surface 35 of the vehicle panel 34, the retaining clips 53 flex back to their original position catching the tapered surfaces 52 on the bottom edge 38 of hole 36 retaining the spray washer nozzle 103 to the vehicle panel 34. While pushing the spray washer nozzle 103 through the hole 36 in the vehicle panel 34, the anti-rotation tab 45 on the spray washer nozzle 103 must be aligned with the anti-rotation notch 39 in the vehicle panel 34. This keeps the spray washer nozzle 103 from rotating in the vehicle panel 34 maintaining the fluid flow at its intended target.

Figure 38:
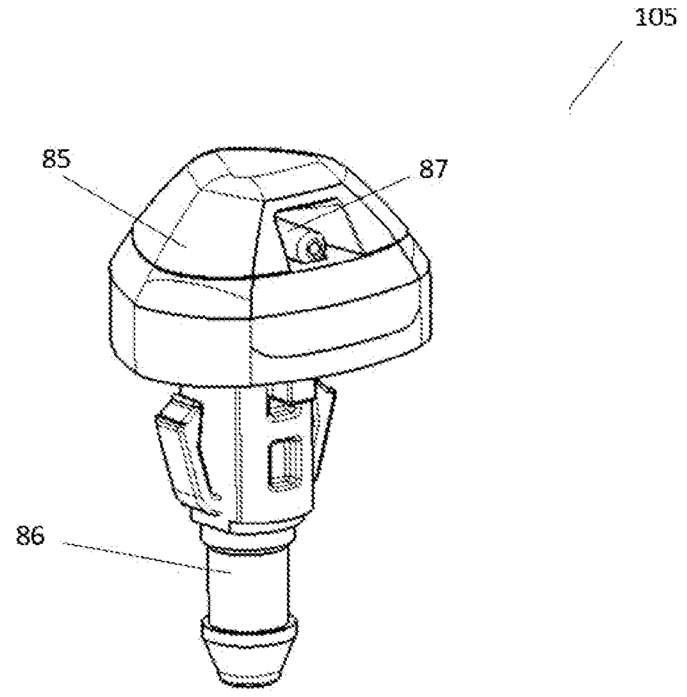
FIG. 38 shows an isometric view of the spray washer nozzle.
Figure 39:
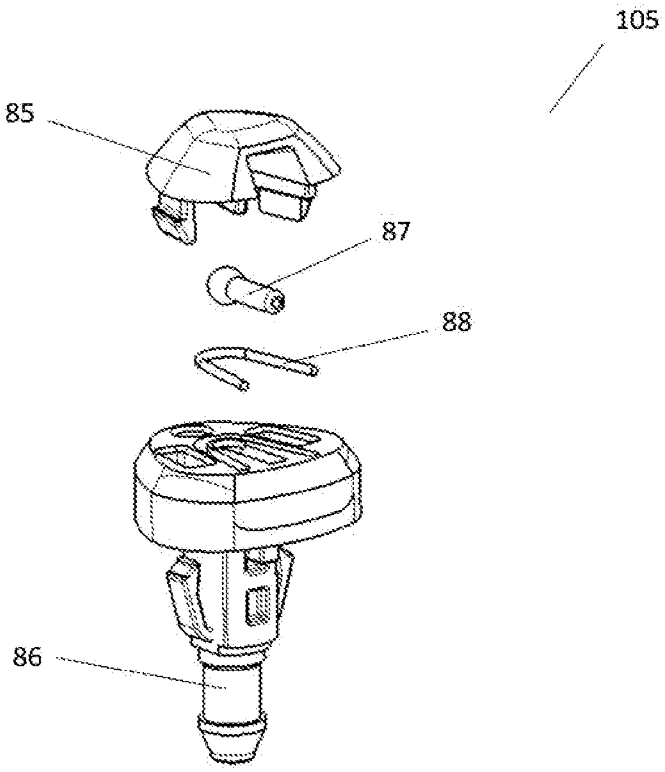
FIG. 39 shows an exploded isometric view of the spray washer nozzle.

FIG. 38 and FIG. 39 show a further spray washer nozzle 105 which comprises an upper housing 85, and a lower housing 86 with a clam shell construction. The housings retain a seal 88 and a nozzle 87 therebetween.

Figure 40:
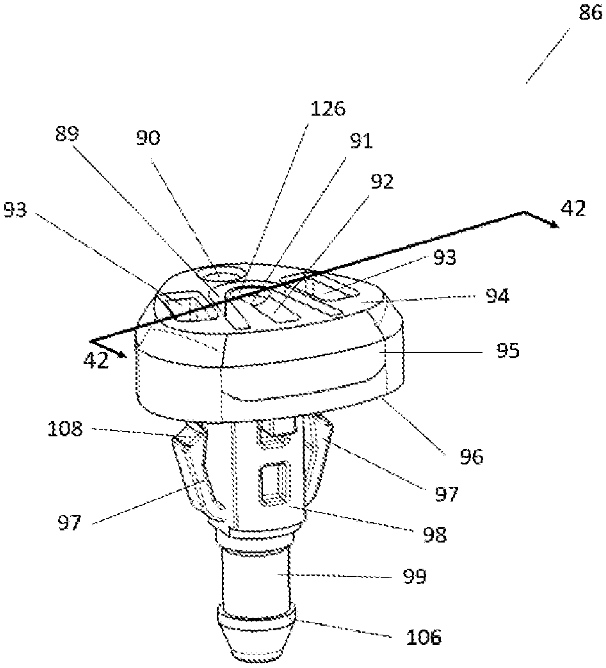
FIG. 40 shows an isometric view of the lower housing.
Figure 41:
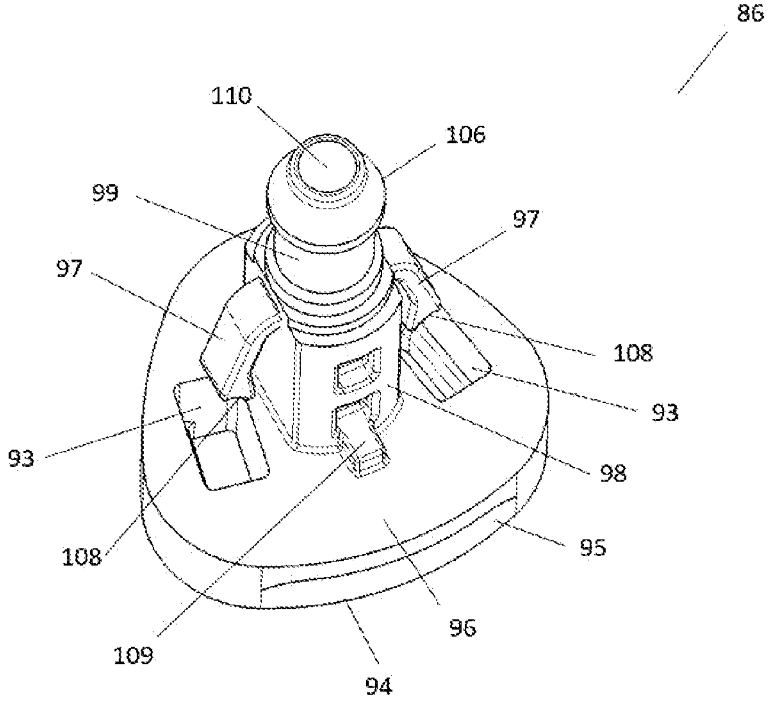
FIG. 41 shows a bottom view of the lower housing.
Figure 42:
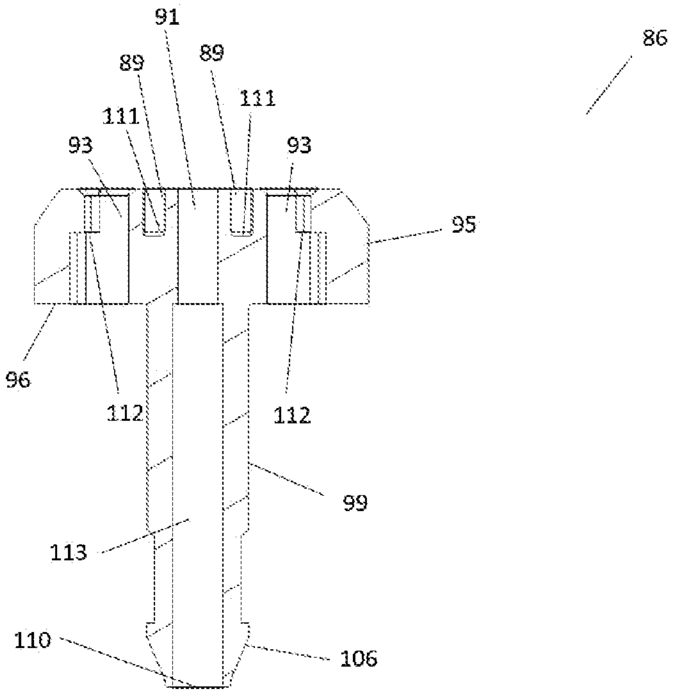
FIG. 42 shows a cross sectional view taken along line 42-42 in FIG. 40.

FIG. 40 through FIG. 42 show a lower housing 86, which is a one-piece construction comprising two main parts, i.e. a head 95 and a nozzle body 98.

The oblong shaped head 95 has a top surface 94 and a bottom surface 96. The top surface 94 has clip retaining slots 93 near the outer edge of the long ends of the head 95 that run through it. The size of the clip retaining slot 93 reduces on the outer side as the retaining clip slot 93 runs from the bottom surface 96 up to the top surface 94 creating a retention surface 112 in the middle of the head 95. A locator slot 90 is placed between the retaining clip slots 93 near the edge of the head 95 that does not extend through the bottom surface 96. A fluid port 91 is located in the center of the head 95 that feeds fluid from the nozzle body 98 to the head 95. A circular shaped socket channel 126 is located at the top edge of the fluid port 91, and a crescent shaped lower nozzle channel 92 extends from the fluid port 91 towards the edge of the long edge of the oblong shaped head 95 on the opposite side of the locator slot 90. A seal slot 89 is horseshoe shaped and placed around the outside of the fluid port 91 and inside the clip retaining slot 93 and the locator slot 90 with the open end of the horseshoe shape facing away from the locator slot 90.

The nozzle body 98 is a circular shaped tube that extrudes downward from the bottom surface 96 of the head 95. Flexible retaining clips 97 protrude outward and upward from the center of the nozzle body 98 at the opposite end of the head 95 with a wedge-shaped end with a tapered surfaces 108 facing away from the nozzle body 11. A circular shaped fluid tube 99 with an inter fluid channel 113 extends downward from the end of the nozzle body 98, and just below the retaining clips 97 has a barbed end 106 containing the fluid inlet 110. Fluid can travel from the fluid inlet 110 in the barbed end 106 through the fluid channel 113 and into the fluid port 91. An anti-rotational tab 109 extends down along the nozzle body 98 away from the bottom surface 96 of the head 95 perpendicular to the retaining clips 97.

Figure 43:
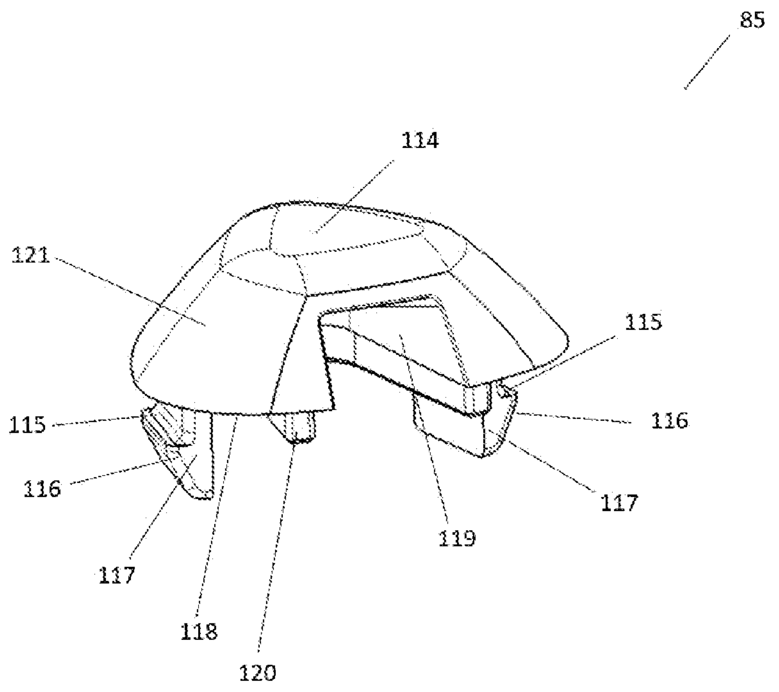
FIG. 43 shows an isometric view of the upper housing.
Figure 44:
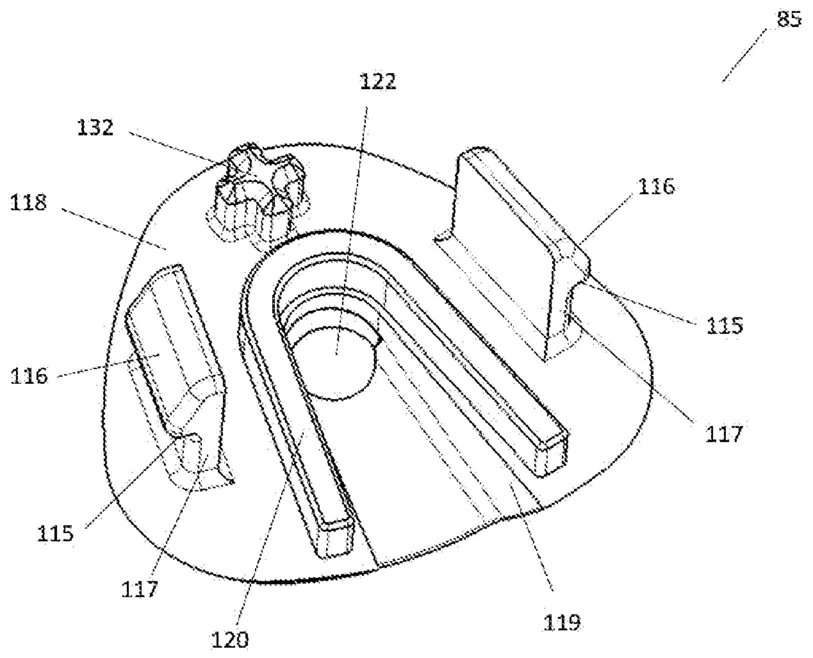
FIG. 44 shows the bottom isometric view of the upper housing.

FIG. 43 and FIG. 44 show the upper housing 85 which is oblong shaped with a flat bottom surface 118 that protrudes upward in a dome 121 with a flat top surface 114. Retaining clips 117 extend downward from the bottom surface 118 near the outer edge of the long ends of the oblong shape. A protruding locator pin 132 is placed between the retaining clips 117 near the edge of the bottom surface 118 on the short side of the oblong shape. The seal rib 120 extends down from the bottom surface 118 encompassing a circular shaped ball socket 122, located in the center of the upper housing 85 between the retaining clips 117, in a horseshoe shape with the opening of the horseshoe on the opposite side of the pin locator 132.

Figure 45A:
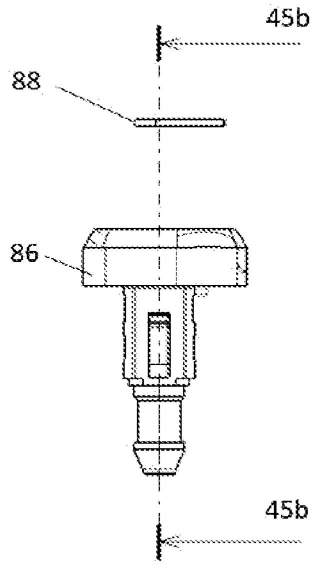
FIG. 45(*a*) shows a right-side view of the seal installation, and FIG. 45(*b*) is a section view taken along line 45(*b*)-45(*b*) in FIG. 45(*a*).
Figure 45B:
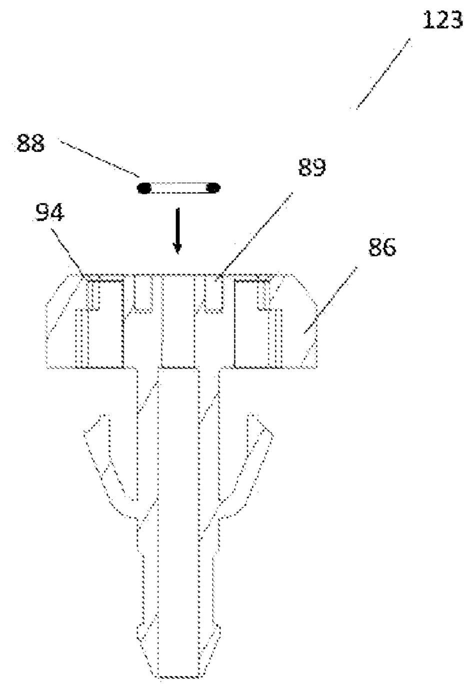
Figure 46A:
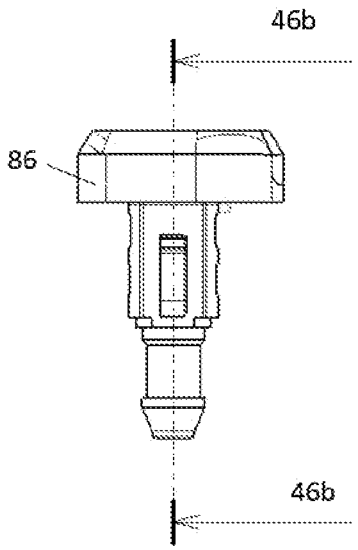
FIG. 46(*a*) shows a right-side view of the seal installation, and FIG. 46(*b*) is a section view taken along line 46(*b*)-46(*b*) in FIG. 46(*a*).
Figure 46B:
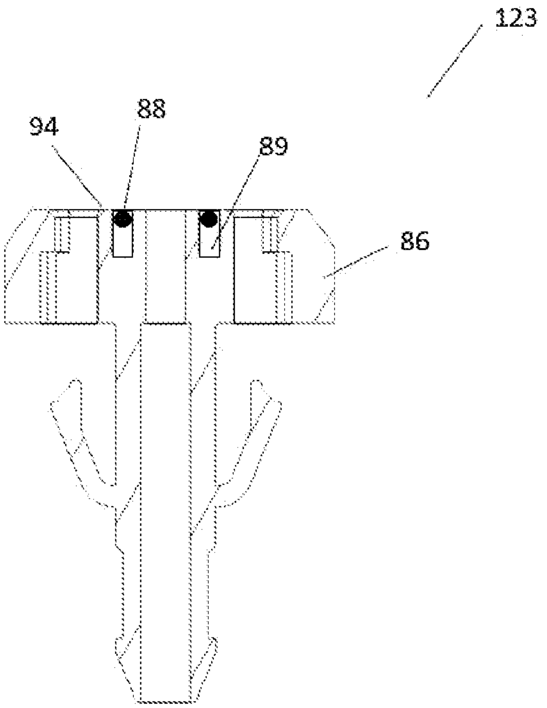

FIG. 45(*a*) to FIG. 46(*b*) show the process for the seal installation 123. A seal 88 is placed into the seal slot 89 in the lower housing 86. Next, the seal 88 is pressed into the lower housing 86 until it is flush with the top surface 94 of the lower housing 86.

Figure 47:
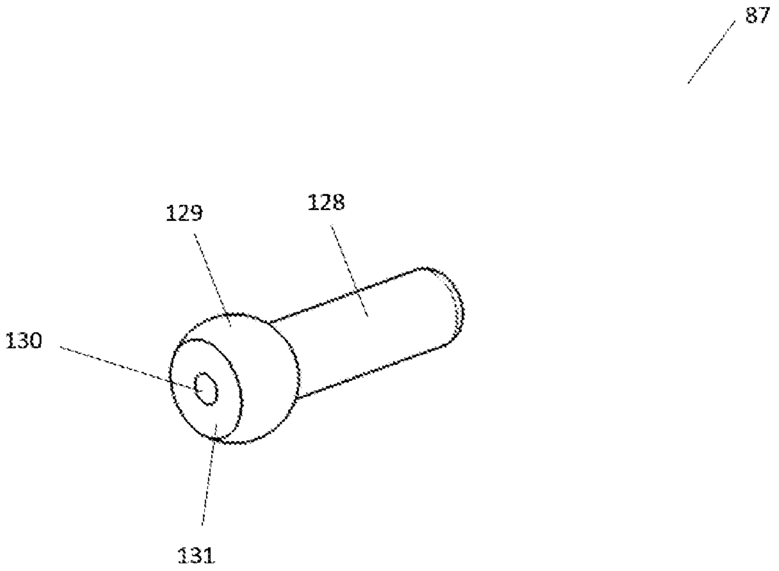
FIG. 47 shows an isometric view of the nozzle.

FIG. 47 shows the nozzle 87 comprising a nozzle socket 129 and a nozzle tube 128. The nozzle socket 129 is a sphere shape with a flat socket surface 131. The nozzle tube 128 extrudes from the nozzle socket 129 on the opposite side of the socket surface 131. A fluid channel 130 runs through the nozzle 87 from the socket surface 131 to the end of the nozzle tube 128.

Figure 48:
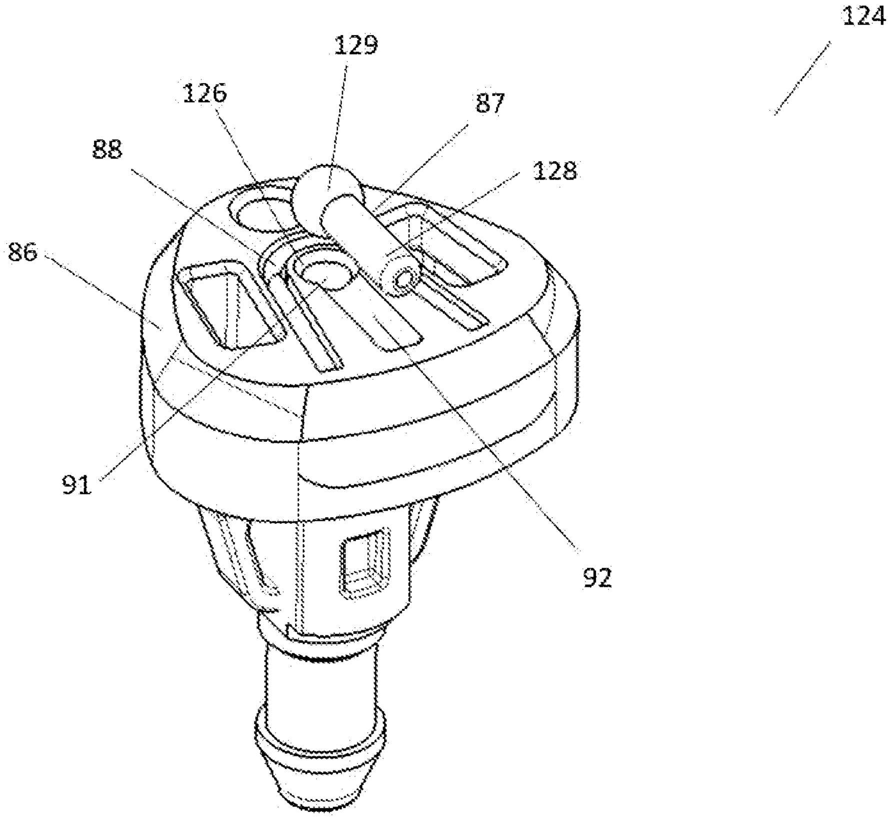
FIG. 48 shows an exploded isometric view of the nozzle installation.

FIG. 48 shows the assembly process of the nozzle installation 124. With the seal 88 installed in the lower housing 86, the nozzle 87 is then placed into the lower housing 86. The nozzle socket 129 of the nozzle 87 is placed into the socket channel 126 of the lower housing 86 with nozzle tube 128 nested in the lower nozzle channel 92.

Figure 49:
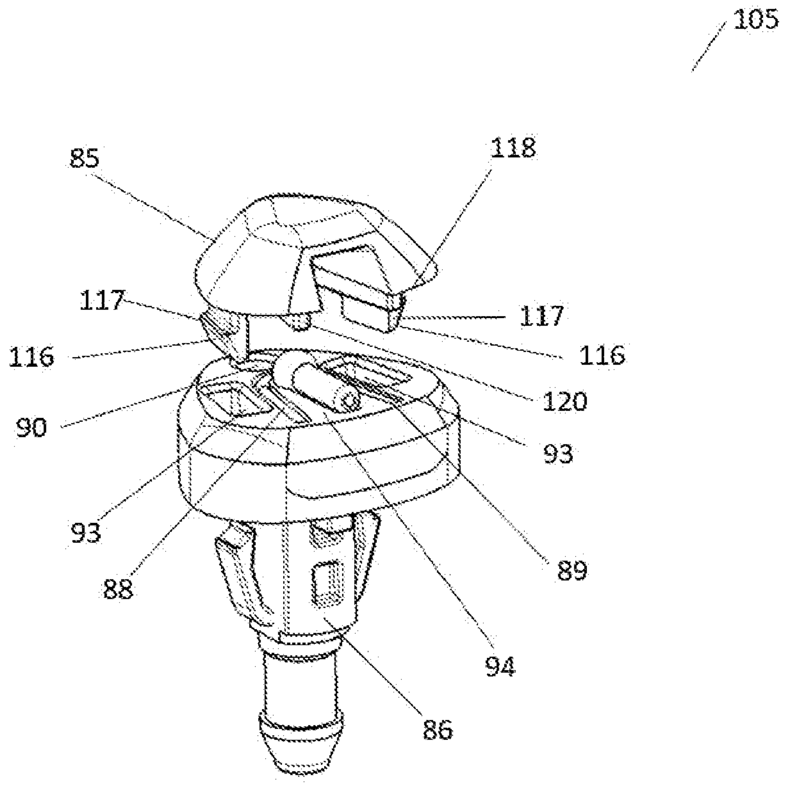
FIG. 49 shows an exploded isometric view of the spray washer nozzle.
Figure 50A:
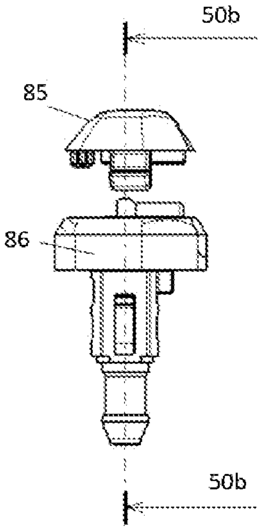
FIG. 50(*a*) shows a right-side view of the spray washer nozzle, and FIG. 50(*b*) is a section view taken along line 50(*b*)-50(*b*) in FIG. 50(*a*).
Figure 50B:
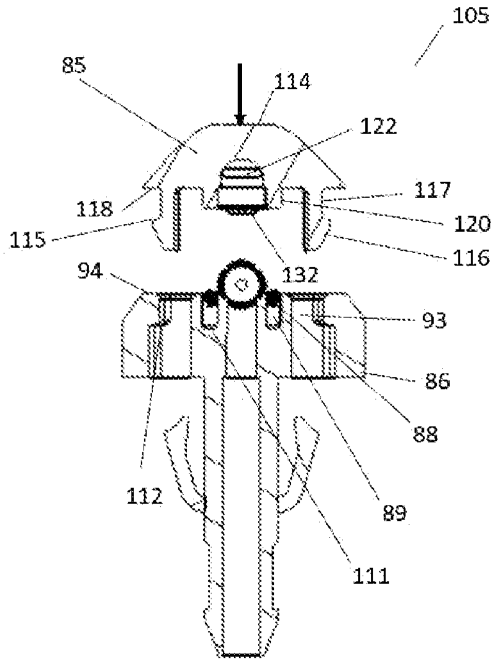
Figure 51A:
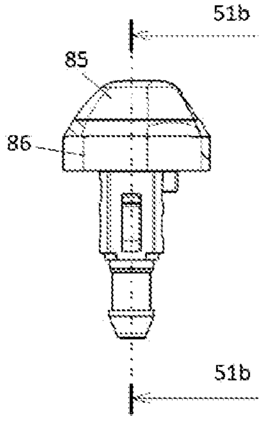
FIG. 51(*a*) shows a right-side view of the spray washer nozzle, and FIG. 51(*b*) is a section view taken along line 51(*b*)-51(*b*) in FIG. 51(*a*).
Figure 51B:
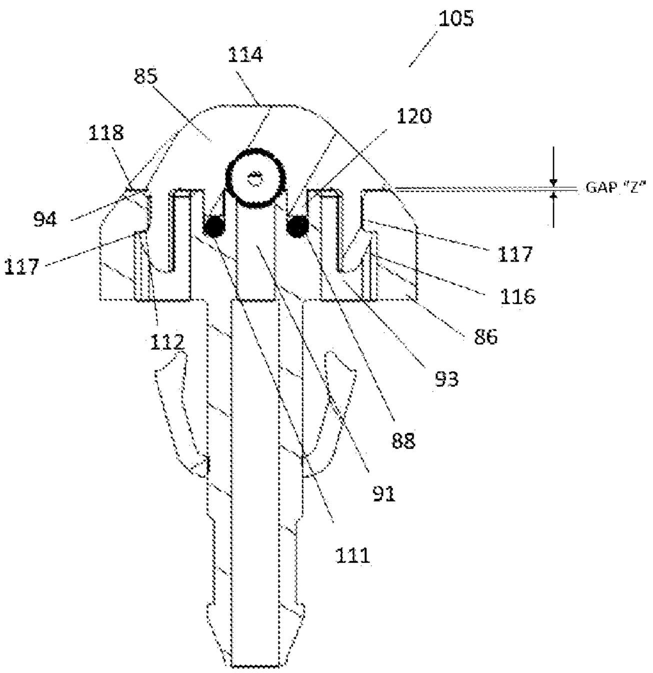
Figure 52:
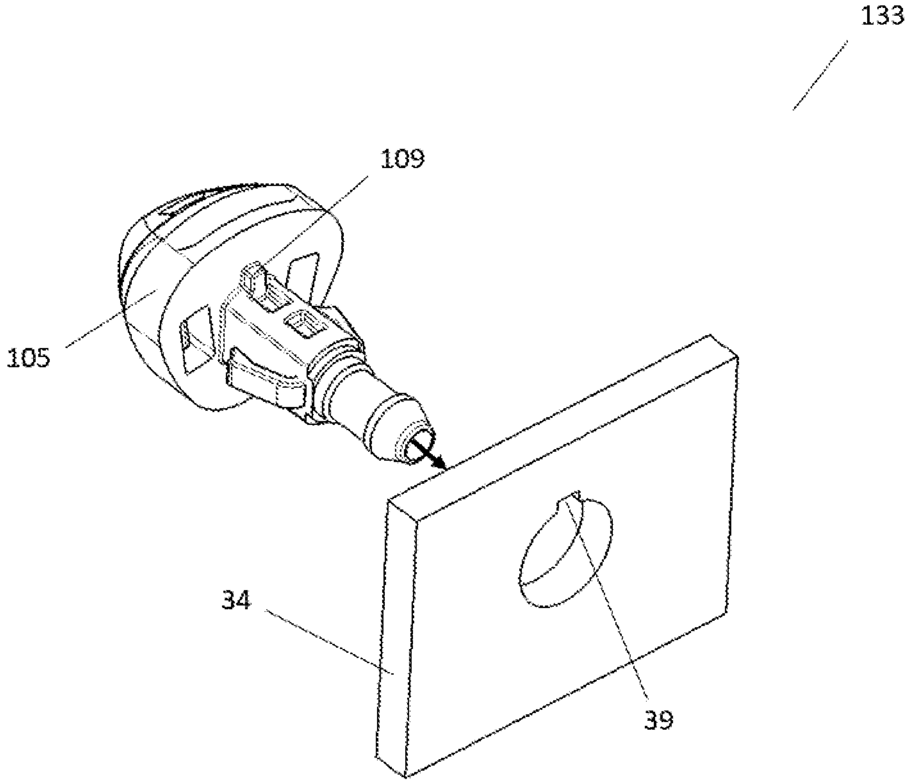
FIG. 52 shows an exploded isometric view of the spray washer nozzle installation.
Figure 53A:
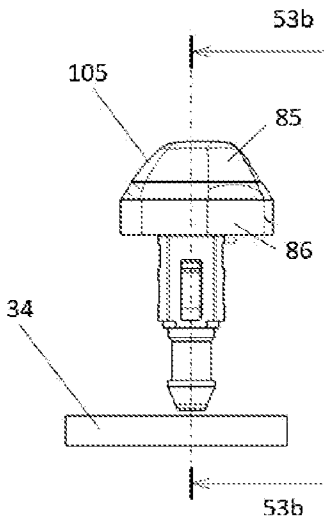
FIG. 53(*a*) shows a right-side view of the spray washer nozzle installation, and FIG. 53(*b*) is a section view taken along line 53(*b*)-53(*b*) in FIG. 53(*a*).
Figure 53B:
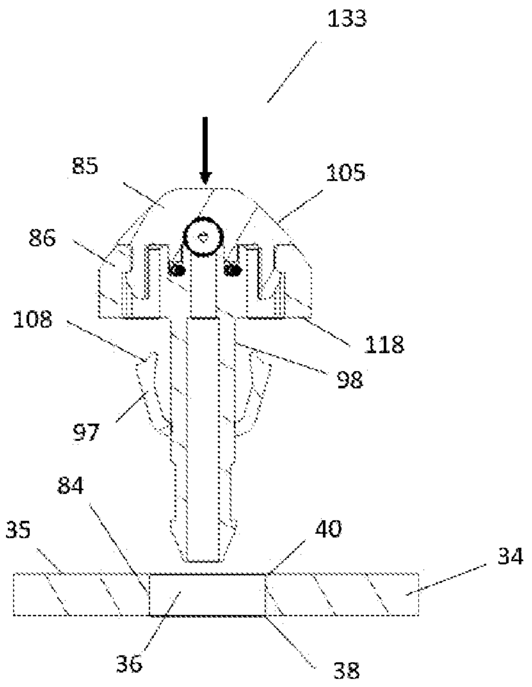
Figure 54A:
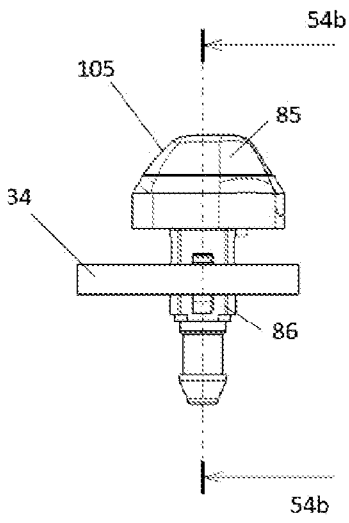
FIG. 54(*a*) shows a right-side view of the spray washer nozzle installation, and FIG. 54(*b*) is a section view taken along line 54(*b*)-54(*b*) in FIG. 54(*a*).
Figure 54B:
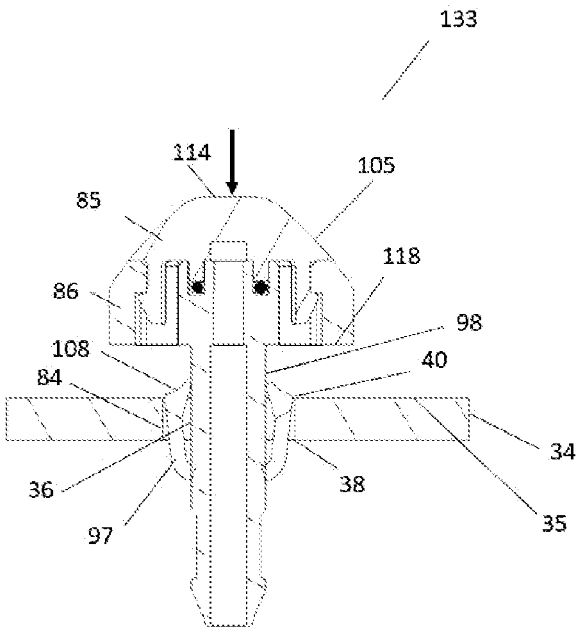
Figure 55A:
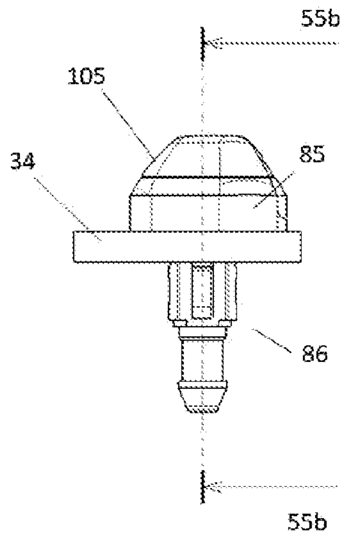
FIG. 55(*a*) shows a right-side view of the spray washer nozzle installation, and FIG. 55(*b*) is a section view taken along line 55(*b*)-55(*b*) in FIG. 55(*a*).
Figure 55B:
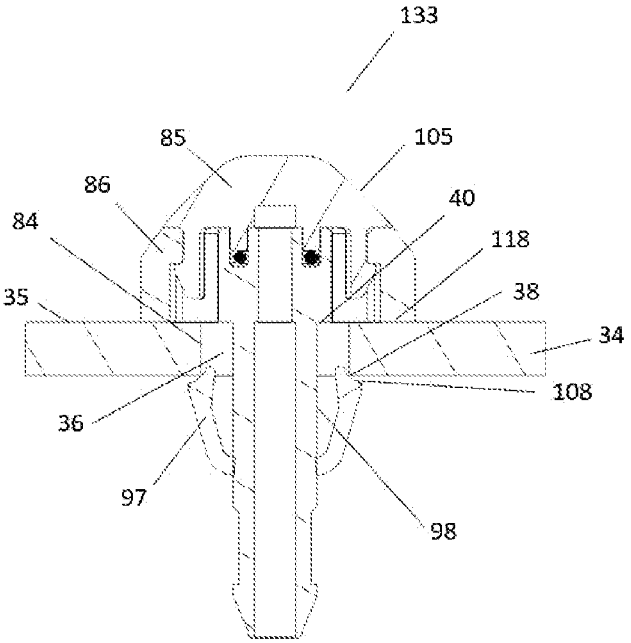
Figure 56:
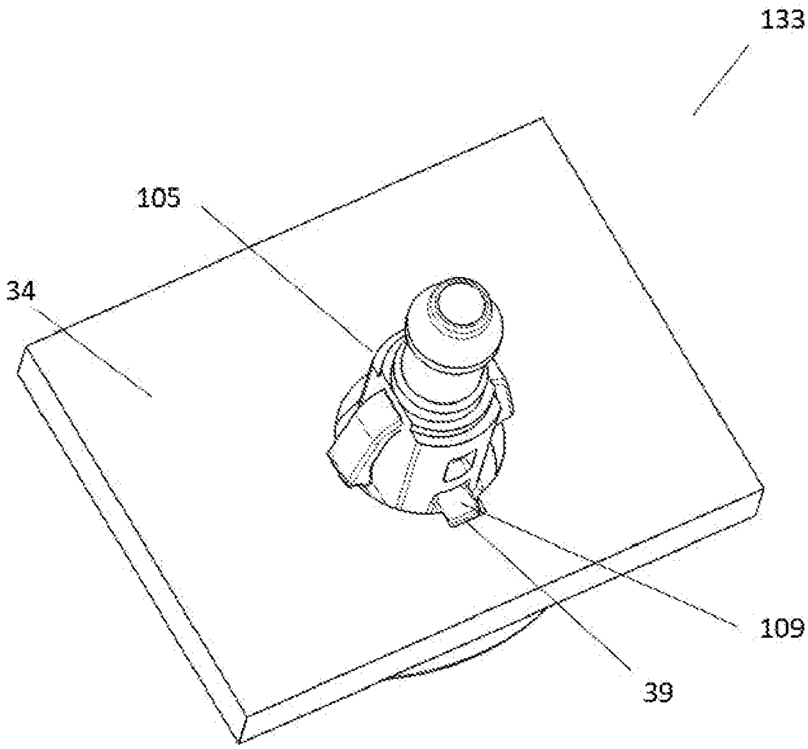
FIG. 56 shows a bottom isometric view of the spray washer nozzle installation.

FIG. 49 through FIG. 51(*b*) show the assembly of the spray washer nozzle 105. The retaining clips 117 on the upper housing 85 are placed into the clip retaining slots 93 in the lower housing 86 with the locator pin 132 of the upper housing 85 aligned with the locator slot 90 in the lower housing 86. Next, pressure is applied to the top surface 114 on the upper housing 85 forcing the retaining clips 117 into the clip retaining slots 93 in the lower housing 86. The tapered surfaces 116 at the end of the retaining clips 117 flex inward to conform to the clip retaining slots 93 until the tapered surfaces 116 move past the retention surfaces 112 in the center of the retaining clip slots 93 at which time the retaining clips 117 flex back to their original position catching the retaining surfaces 115 of the retaining clips 117 under the retention surface 112 of the lower housing 86.

Simultaneously as the force is applied to the top surface 114 of the upper housing 85, the seal rib 120 on the bottom surface 118 of the upper housing 85 contacts the surface of the seal 88 pressing it farther down into the seal slot 89 until the seal 88 contacts seal surface 111 at the bottom of the seal slot 89 compressing it between the upper housing 85 and the lower housing 86. This seals the bottom surface 118 of the upper housing 85 and the top surface 94 of the lower housing 86 creating a fluid tight seal around the fluid port 91. A small gap "Z" is maintained between the upper housing 85 and the lower housing 86 where the seal 88 is compressed.

FIG. 52 through FIG. 56 show the process of the spray washer nozzle installation 133. The nozzle body 98 of the spray washer nozzle 105 is placed into the hole 36 of the vehicle panel 34. Pressure is applied to the top surface 114 of the upper housing 85 forcing the retaining clips 97 through the hole 36. The retaining clips 97 are flex inward by the upper edge 40 of the of hole 36 allowing the nozzle body 98 to pass through the inside surface 84 of hole 36 in the vehicle panel 34. When the bottom surface 118 of the upper housing 85 contacts the top surface 35 of the vehicle panel 34, the retaining clips 97 flex back to their original position catching the tapered surfaces 108 on the bottom edge 38 of hole 36 retaining the spray washer nozzle 105 to the vehicle panel 34.

While pushing the spray washer nozzle 105 through the hole 36 in the vehicle panel 34, the anti-rotation tab 109 on the spray washer nozzle 105 must be aligned with the anti-rotation notch 39 in the vehicle panel 34. This keeps the spray washer nozzle 105 from rotating in the vehicle panel 34 maintaining the fluid flow at its intended target.

Figure 57:
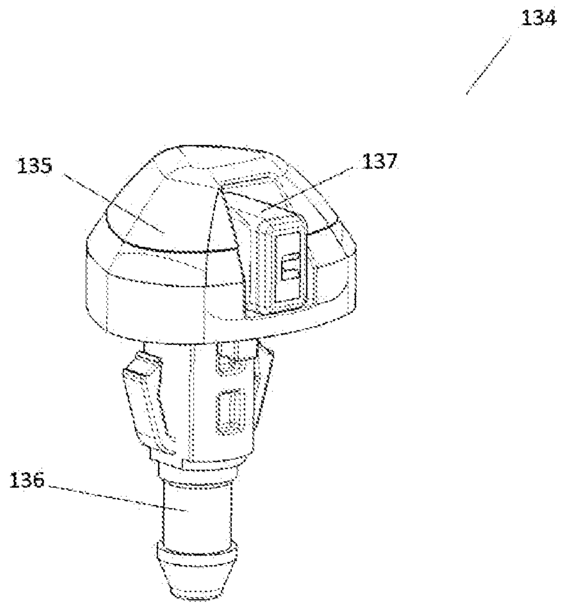
FIG. 57 shows an isometric view of the spray washer nozzle.
Figure 58:
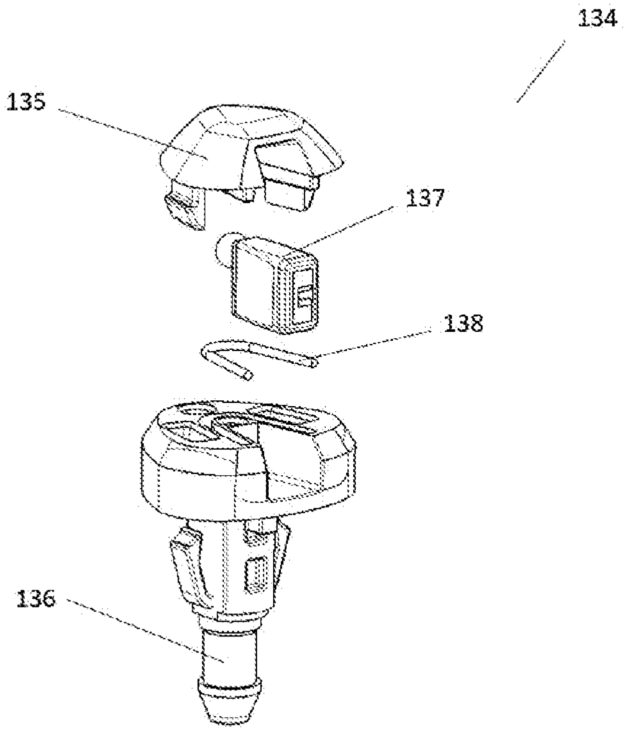
FIG. 58 shows an exploded isometric view of the spray washer nozzle.

FIG. 57 and FIG. 58 show a still further spray washer nozzle 134 which comprises an upper housing 135 and a lower housing 136. The housings retain the seal 138 and the nozzle 137 between them.

Figure 59:
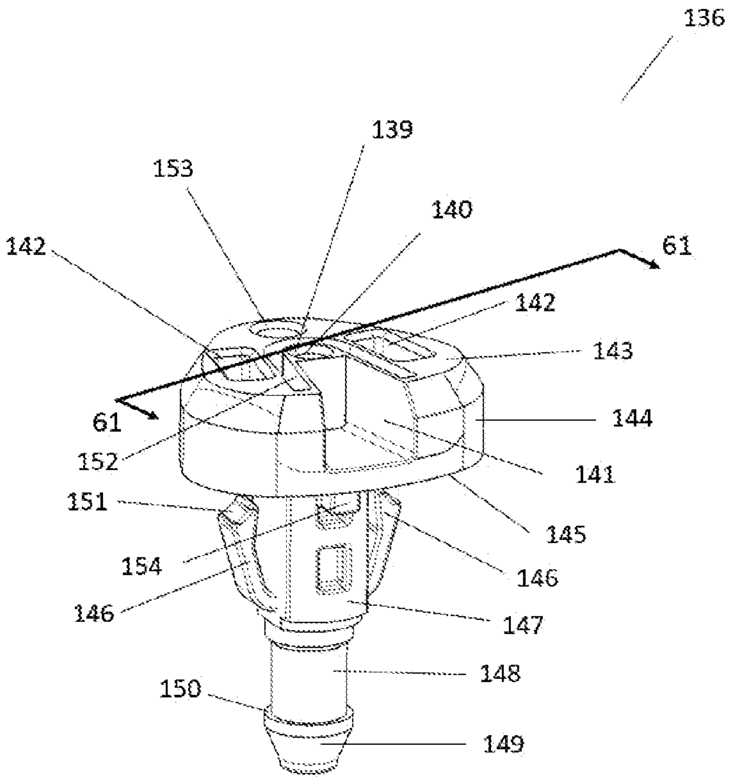
FIG. 59 shows an isometric view of the lower housing.
Figure 60:
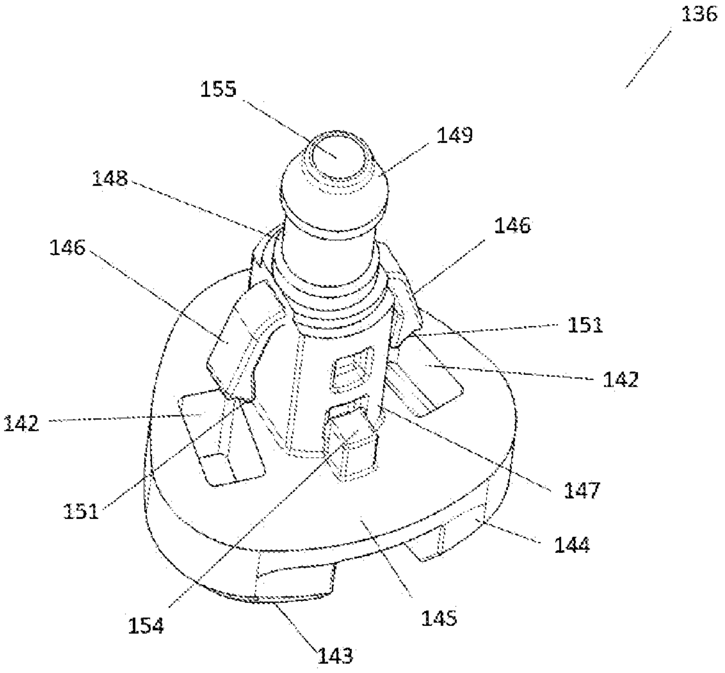
FIG. 60 shows a bottom isometric view of the lower housing.
Figure 61:
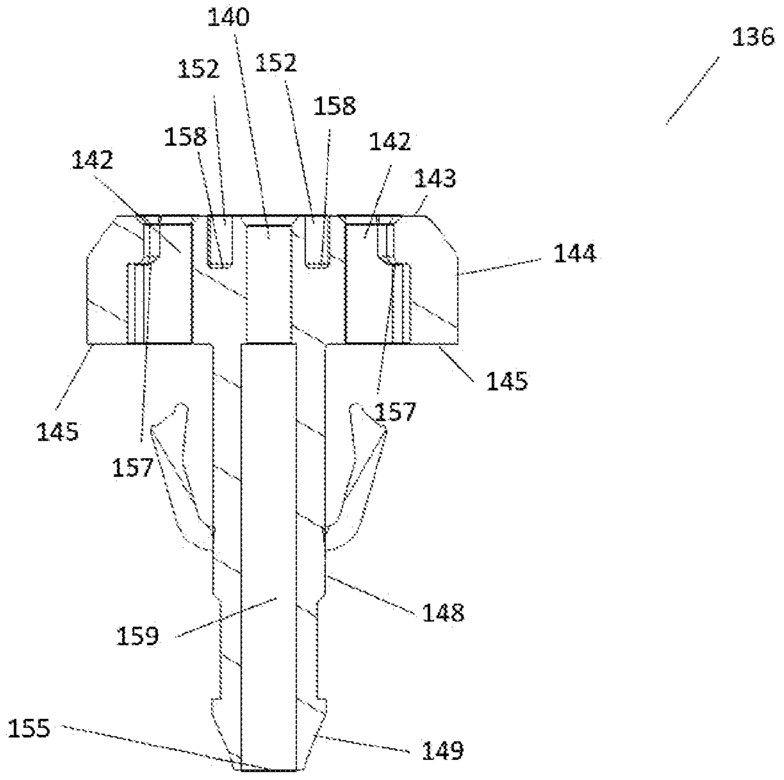
FIG. 61 shows a cross section view taken along line 61-61 in FIG. 59.

FIG. 59 through FIG. 61 show the lower housing 136 which is a one-piece construction comprising two main parts, i.e. a head 144 and a nozzle body 147.

The oblong shaped head 144 has a top surface 143 and a bottom surface 145. The top surface 143 has clip retaining slots 142 near the outer edge of the long ends of the head 144 that run through it. The size of the clip retaining slot 142 reduces on the outer side as the clip retaining slot 142 runs from the bottom surface 145 up to the top surface 143 creating a retention surface 157 in the middle of the head 144. A locator slot 153 is placed between the retaining clip slots 142 near the edge of the head 144 that does not extend through the bottom surface 145. A fluid port 140 is located in the center of the head 144 that feeds fluid from the nozzle body 147 to the head 144. The seal slot 152 is horseshoe shaped and placed around the outside of the fluid port 140 and on the inside of the clip retaining slot 142 and the locator slot 153 with the open end of the horseshoe shape facing away from the locator slot 153.

A nozzle or socket channel 141 is cut down front the top surface 143 offset from the bottom surface 145 of the head 144 in front of the fluid port 140 inside the horseshoe shaped seal slot 152 and runs to the edge of the head 144. A circular shaped socket channel 139 runs around the top edge of the fluid port 140.

The nozzle body 147 extends downward from the bottom surface 145 of the head 144. Flexible retaining clips 146 protrude outward and upward from the center of the nozzle body 147 at the opposite end of the head 144 with a wedge-shaped end with tapered surfaces 151 facing away from the nozzle body 147. A circular shaped fluid tube 148 with an inner fluid channel 159 extends downward from the end of the nozzle body 147 just below the retaining clips 146 that is capped with a barbed end 149 containing the fluid inlet 155. Fluid can then travel from the fluid inlet 155 in the barbed end 149 through the fluid channel 159 and into the fluid port 140. An anti-rotational tab 154 extends down along the nozzle body 147 away from the bottom surface 145 of the head 144 perpendicular to the retaining clips 146.

Figure 62:
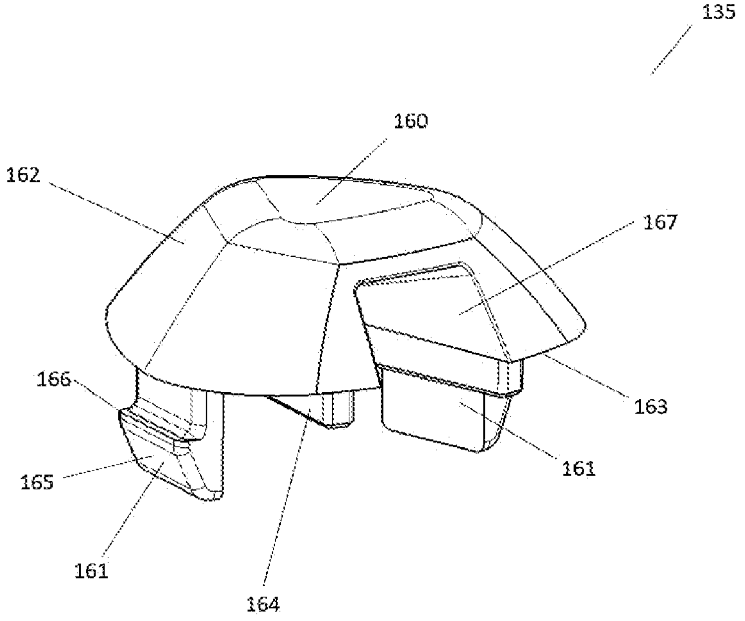
FIG. 62 shows an isometric view of the upper housing.
Figure 63:
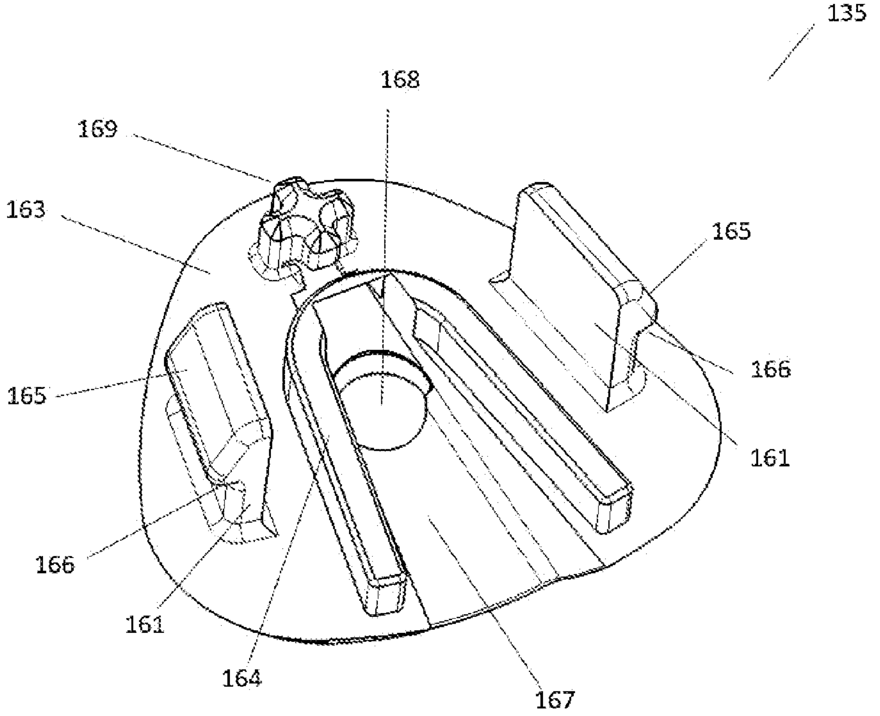
FIG. 63 shows a bottom isometric view of the upper housing.

FIG. 62 and FIG. 63 show the upper housing 135 which is oblong shaped with a flat bottom surface 163 that protrudes upward in a dome 162 with a flat top surface 160. Retaining clips 161 extend downward from the bottom surface 163 near the outer edge of the long ends of the oblong shape. Ends of the retaining clips 161 are wedge shaped creating a tapered surface 165 on the outer sides of the retaining clips 161 and a retaining surface 166 on the upper edge of the wedge shape. A protruding locator pin 169 is placed between the retaining clips 161 near the edge of the bottom surface 163 on the short side of the oblong shape. The seal rib 164 extends down from the bottom surface 163 and encompasses a circular shaped ball socket 168, located in the center of the upper housing 135 between the retaining clips 161, in a horseshoe shape with the opening of the horseshoe on the opposite side of the pin locator 169.

Figure 64A:
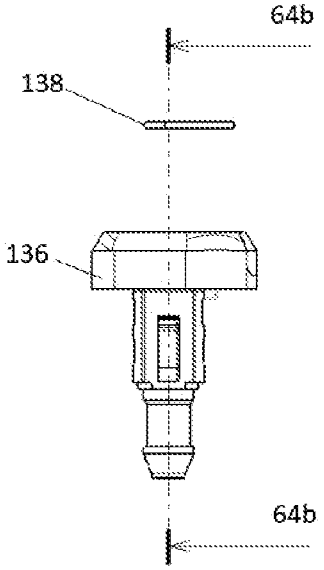
FIG. 64(*a*) shows a right-side view of the seal installation, and FIG. 64(*b*) is a section view taken along line 64(*b*)-64(*b*) in FIG. 64(*a*).
Figure 64B:
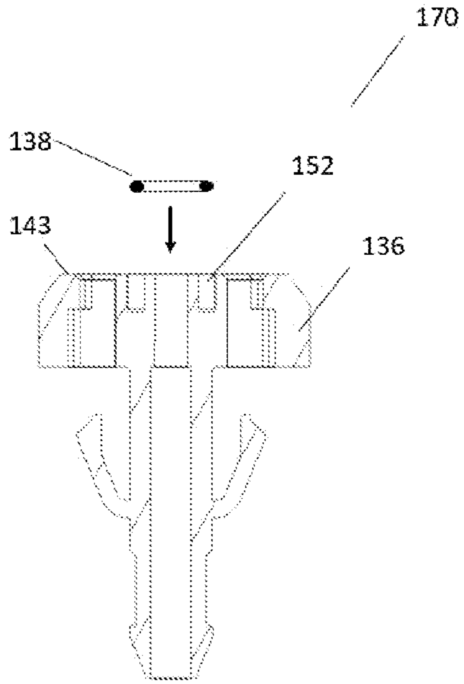
Figure 65A:
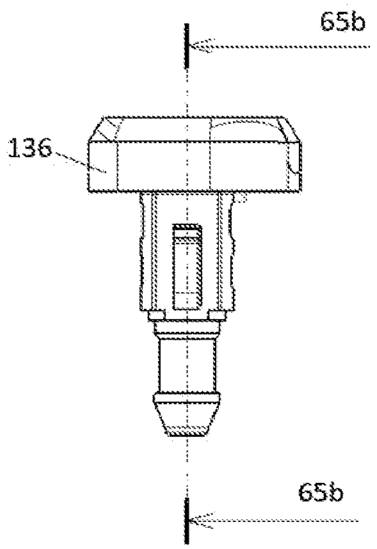
FIG. 65(*a*) shows a right-side view of the seal installation, and FIG. 65(*b*) is a section view taken along line 65(*b*)-65(*b*) in FIG. 65(*a*).
Figure 65B:
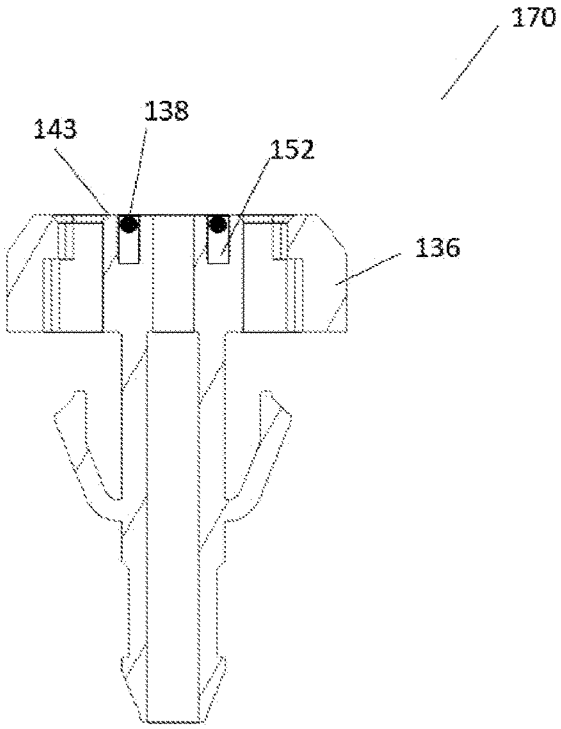

FIG. 64(*a*) to FIG. 65(*b*) show the process for the seal installation 170. The seal 138 is placed into the seal slot 152 in the lower housing 136. Next, the seal 138 is pressed into the lower housing 136 until it is flush with the top surface 143 of the lower Housing 136.

Figure 66A:
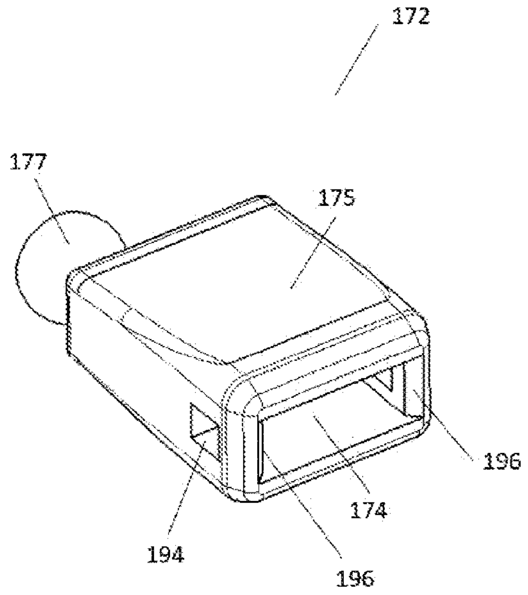
FIG. 66A shows an isometric front view of the nozzle housing.
Figure 66B:
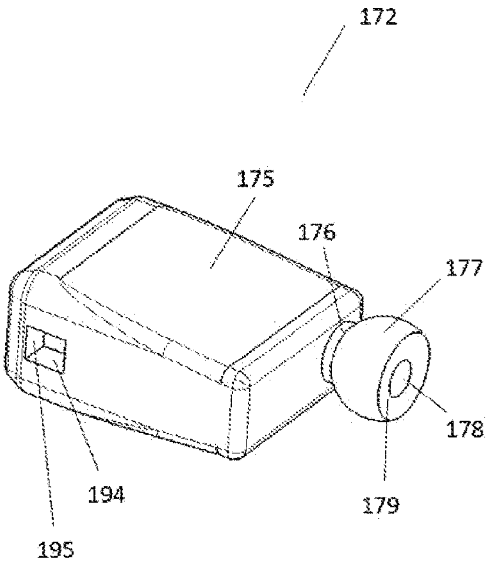
FIG. 66B shows an isometric rear view of the nozzle housing.

FIG. 66A and FIG. 66B show the nozzle housing 172 comprising two main parts, i.e. a body 175 and a socket 177. The body 175 is a rectangular shape with a fluidic clip slot 174 cut into the short end creating a pocket within the body 175 open on one end. Tapered guides 196 are located on the short edges of the open side of the fluidic clip slot 174. Retaining slots 194 are located on the long sides of the body 175 running through to the fluidic clip slot 174 on the open end of the body 175. The retaining slots 194 have a retaining surface 195 on the inner edge on side of the socket 177.

A circular socket 177 is connected to the body 175 with a tubular neck 176 offset to one side of the body 175 on the closed end on the opposite side of the fluidic clip slot 174 in the body 175. A socket surface 179 is cut on the back side of the socket 177 on the opposite side of the neck 176. A fluid port 178 runs from the socket surface 179 through the neck 176 and into the open fluidic clip slot 174 in the body 175.

Figure 67:
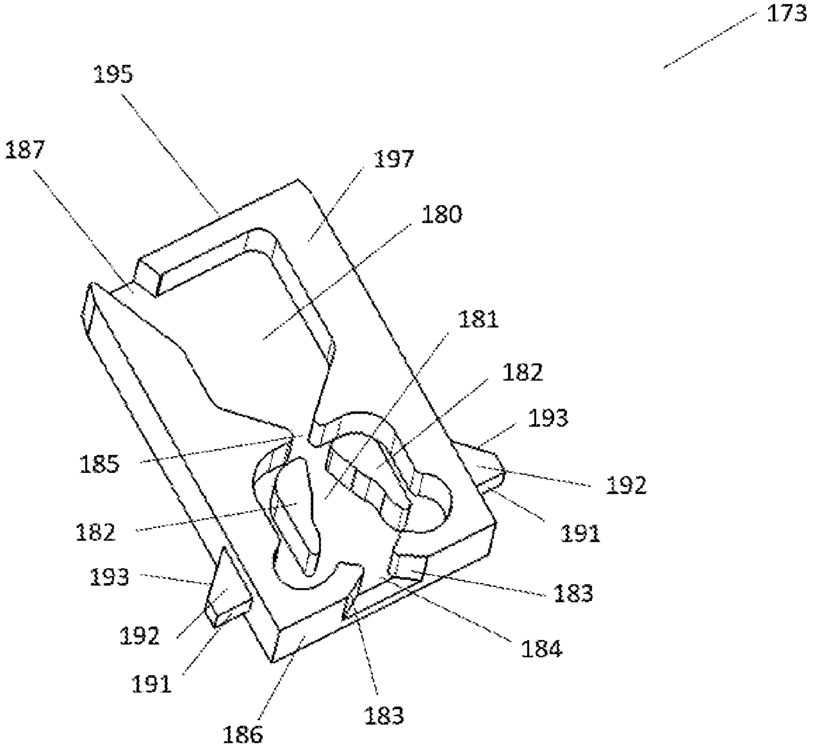
FIG. 67 shows an isometric view of the fluidic clip.

FIG. 67 shows the fluidic clip 173 which comprises a rectangular shaped block with a nozzle face 186 and a back surface 195 on the short ends. A primary fluid chamber 180 is cut into the open face 197 near the back surface 195 creating a wall between them. A fluid inlet port 187 is cut into the back surface 195 connecting to the corner of the primary fluid chamber 180. A secondary fluid chamber 181 is cut into the open face 197 next to the primary fluid chamber 180 on the nozzle face 186 end. A fluid channel 185 is cut into the open face 197 connecting the primary fluid chamber 180 and the secondary fluid chamber 181. The fluid channel 185 is much smaller than the primary fluid chamber 180 and the secondary fluid chamber 181.

Fluid control tabs 182 are placed in the secondary fluid chamber 181 to direct the flow of the fluid. A nozzle face 186 is placed along a short side of the block shape perpendicular to the primary fluid chamber 180 and secondary fluid chamber 181. The nozzle face 186 and the secondary fluid chamber 181 are connected with a fluid exit port 184 that is much smaller than the secondary fluid chamber 181 and the nozzle face 186. Angled spray guides 183 run along the edges of the fluid exit port 184 on the nozzle face 186 to guide the fluid to its target. Wedge shaped retaining clips 192 extend outward from the long sides of the rectangular block with a flat retaining surface 191 facing the nozzle face 186 and a tapered surface 193 on the opposite side facing the back surface 195.

Figure 68:
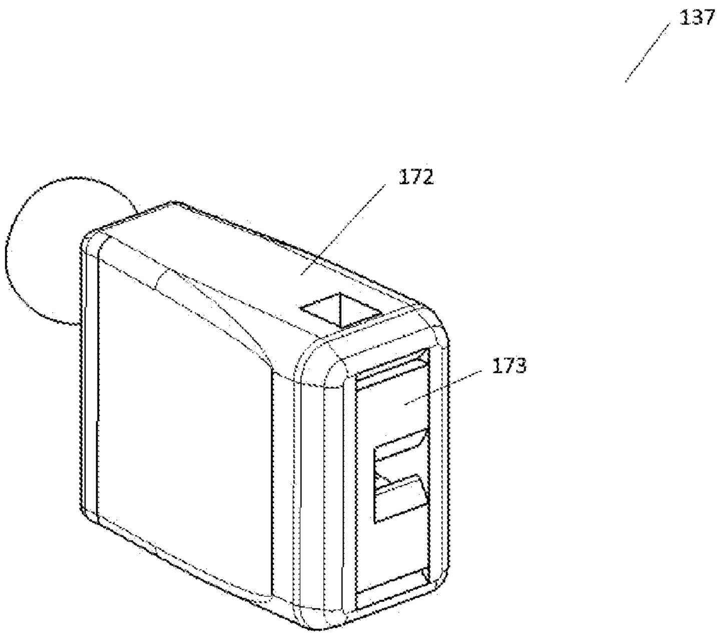
FIG. 68 shows an isometric view of the nozzle.
Figure 69:
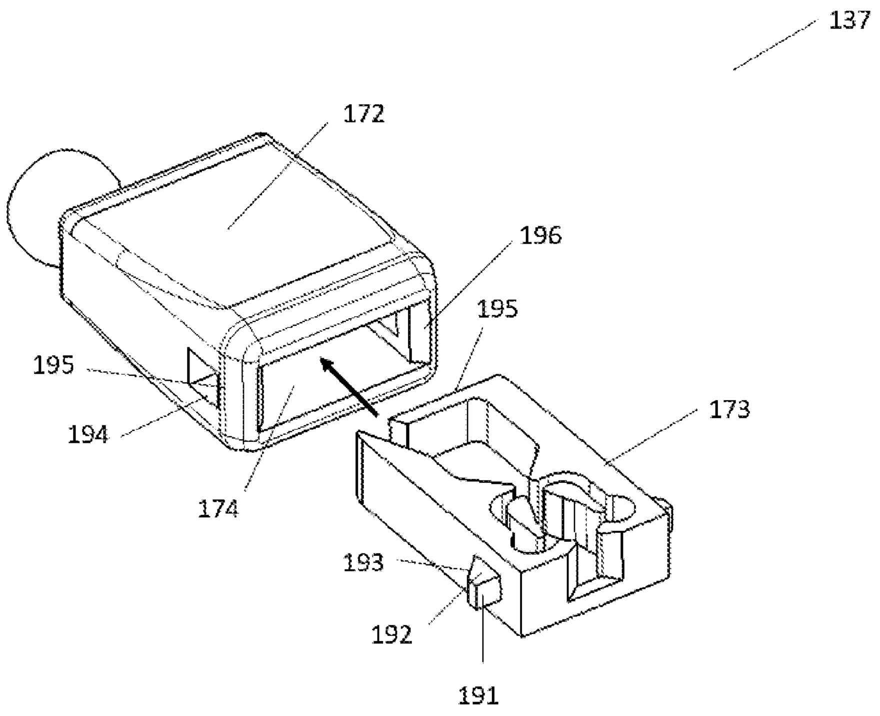
FIG. 69 shows an exploded isometric view of the nozzle.
Figure 70A:
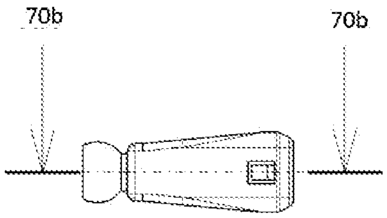
FIG. 70(*a*) shows a right-side view of the nozzle, and FIG. 70(*b*) is a section view taken along line 70(*b*)-70(*b*) in FIG. 70(*a*).
Figure 70B:
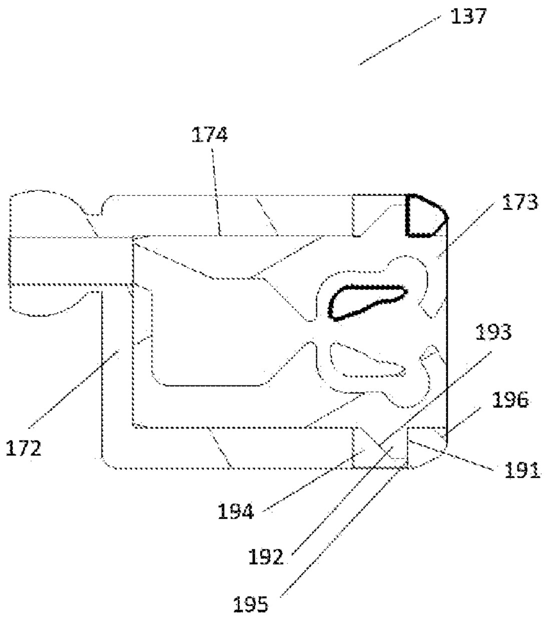

FIG. 68 through FIG. 70(*b*) show the nozzle 137 comprising a nozzle housing 172 and the fluidic chip 173. The fluid chip 173 is inserted into the nozzle housing 172 placing the back surface 195 end of the fluidic chip 173 into the fluidic chip slot 174 in the nozzle housing 172. The tapered surfaces 193 of the retaining clips 192 on the fluidic chip 173 contact the tapered guides 196 in the fluidic chip slot 174 in the nozzle housing 172 and compress the retaining clips 192 inward. The retaining clips 192 will flex back to their original shape after entering the retaining slots 194 in the nozzle housing 172. This causes the retaining surfaces 191 on the retaining clips 192 to contact the retaining surfaces 195 in the retaining slots 194 securing the fluidic chip 173 within the nozzle housing 172.

Figure 71:
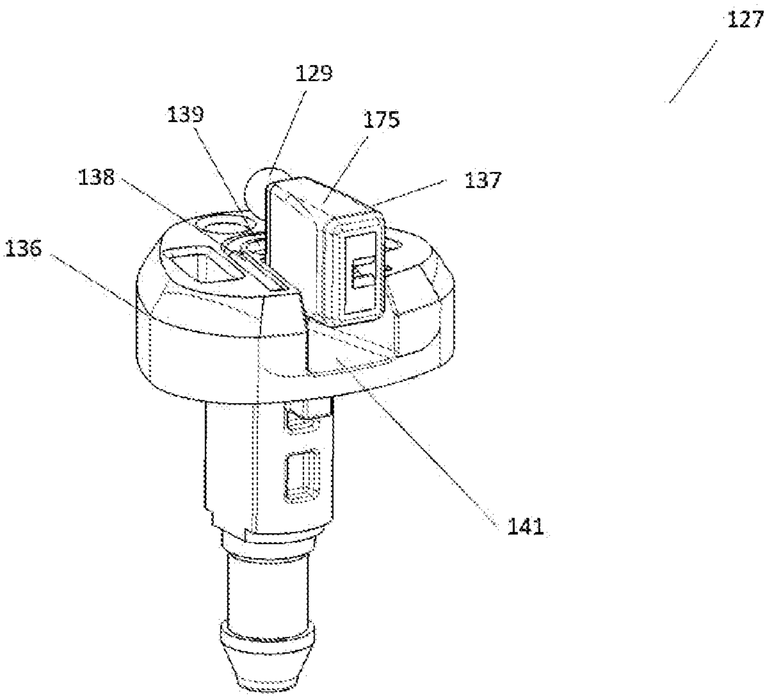
FIG. 71 shows an exploded isometric view of the nozzle installation.

FIG. 71 shows the assembly process of the nozzle installation 127. With the seal 138 installed in the lower housing 136, the nozzle 137 is placed into the lower housing 136. The nozzle socket 129 of the nozzle 137 is placed into the socket channel 139 of the lower housing 136 with the nozzle housing 175 nested in the lower channel 141.

Figure 72:
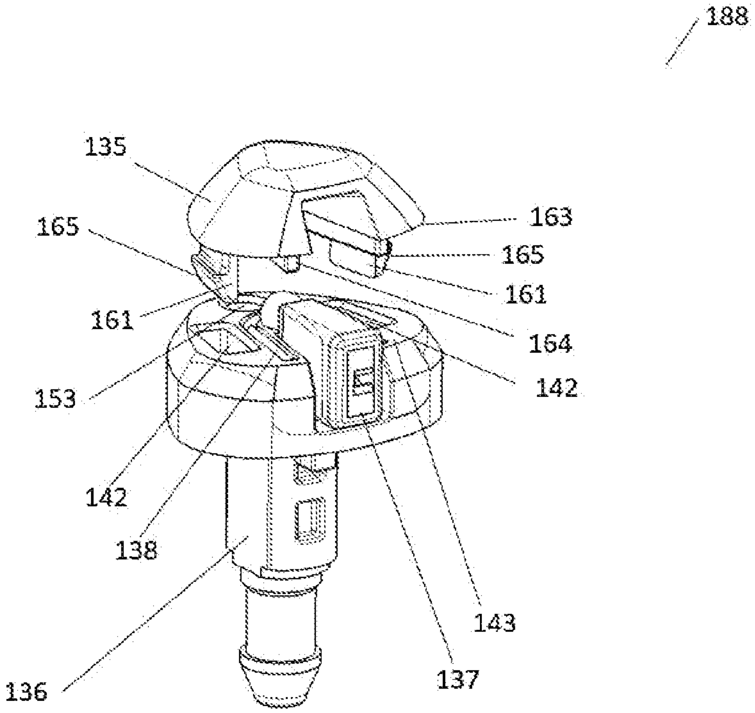
FIG. 72 shows an exploded isometric view of the spray washer nozzle.
Figure 73A:
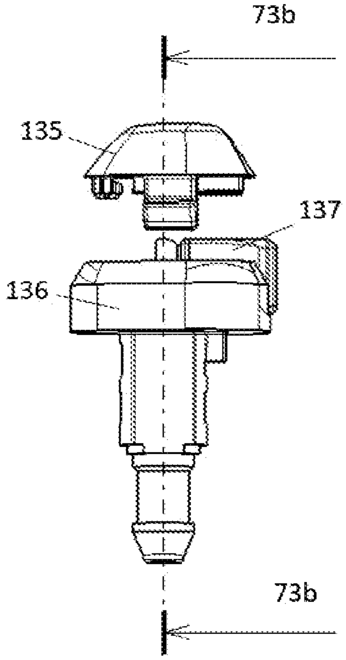
FIG. 73(*a*) shows a right-side exploded view of the spray washer nozzle, and FIG. 73(*b*) is a section view taken along line 73(*b*)-73(*b*) in FIG. 73(*a*).
Figure 73B:
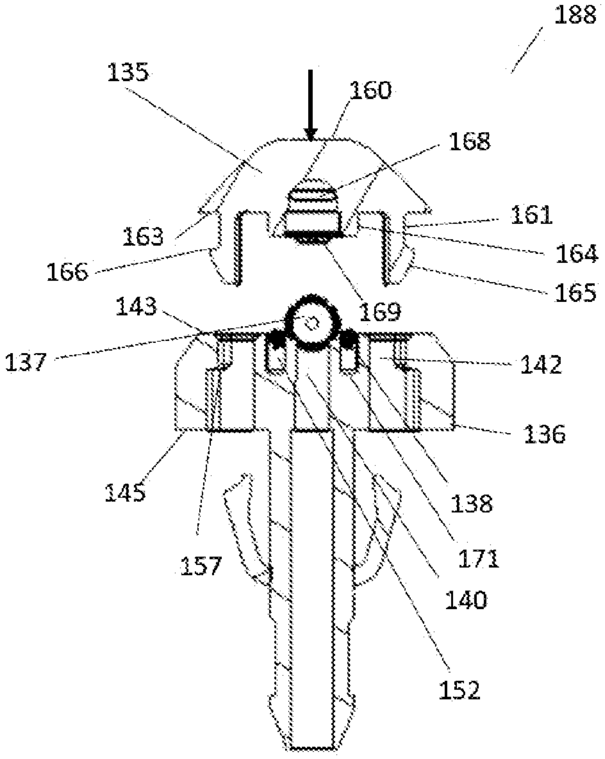
Figure 74A:
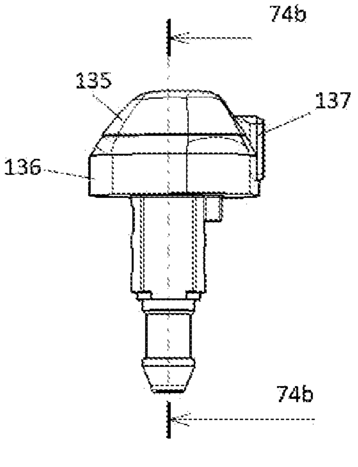
FIG. 74(*a*) shows a right-side view of the spray washer nozzle, and FIG. 74(*b*) is a section view taken along line 74(*b*)-74(*b*) in FIG. 74(*a*).
Figure 74B:
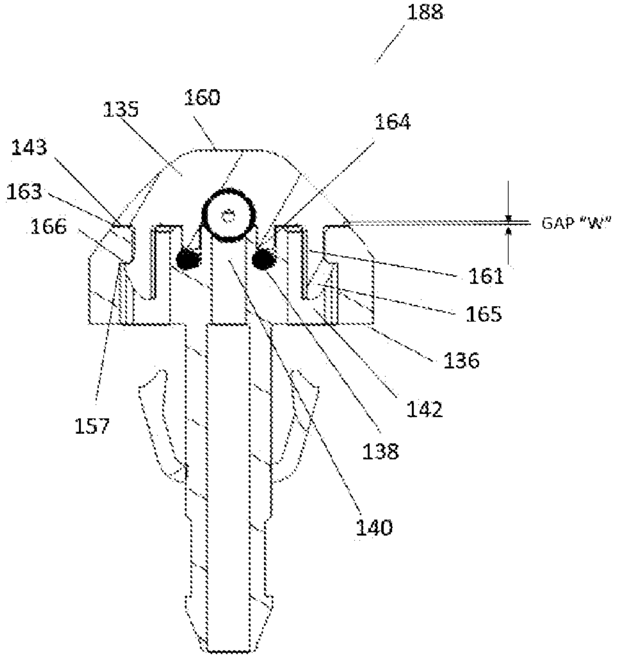
Figure 75:
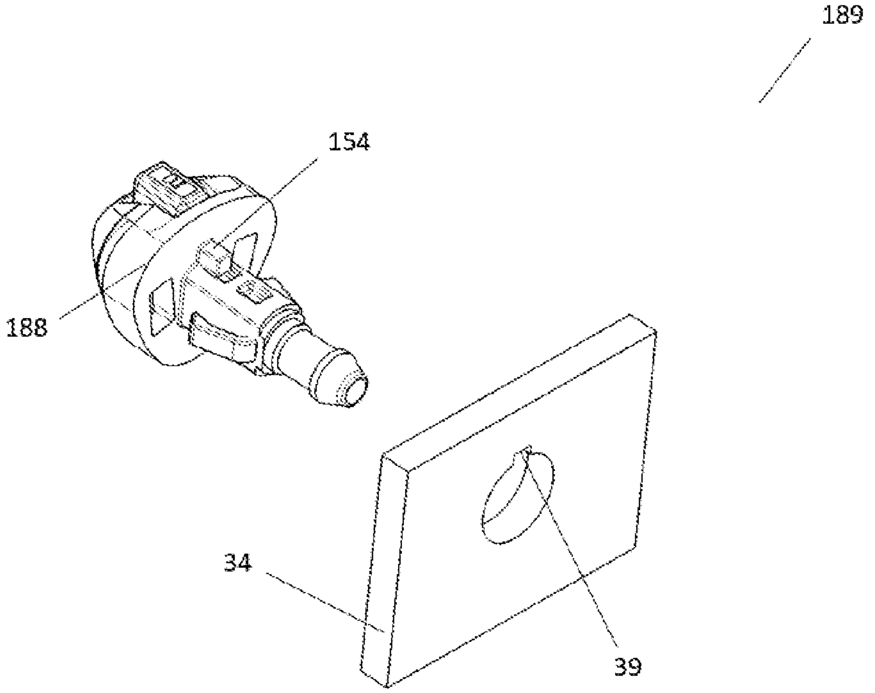
FIG. 75 shows an exploded isometric view of the spray washer nozzle installation.
Figure 76A:
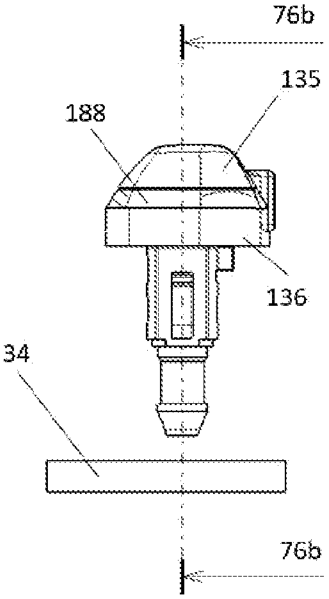
FIG. 76(*a*) shows a right-side exploded view of the spray washer nozzle installation, and FIG. 76(*b*) is a section view taken along line 76(*b*)-76(*b*) in FIG. 76(*a*).
Figure 76B:
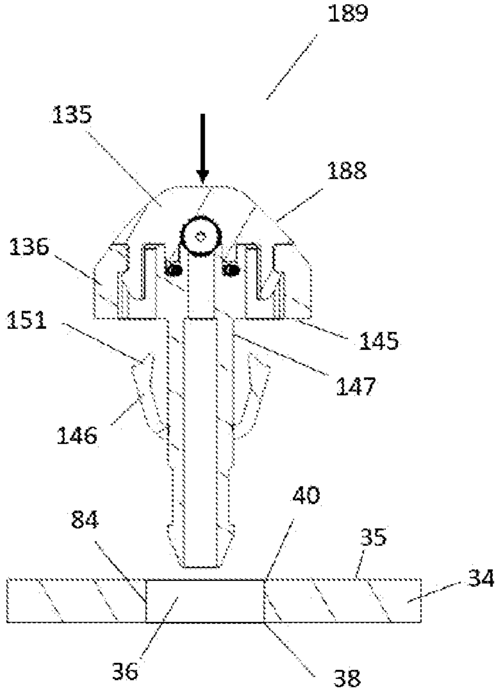
Figure 77A:
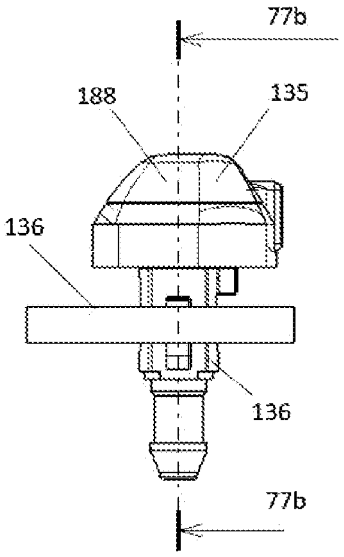
FIG. 77(*a*) shows a right-side exploded view of the spray washer nozzle installation, and FIG. 77(*b*) is a section view taken along line 77(*b*)-77(*b*) in FIG. 77(*a*).
Figure 77B:
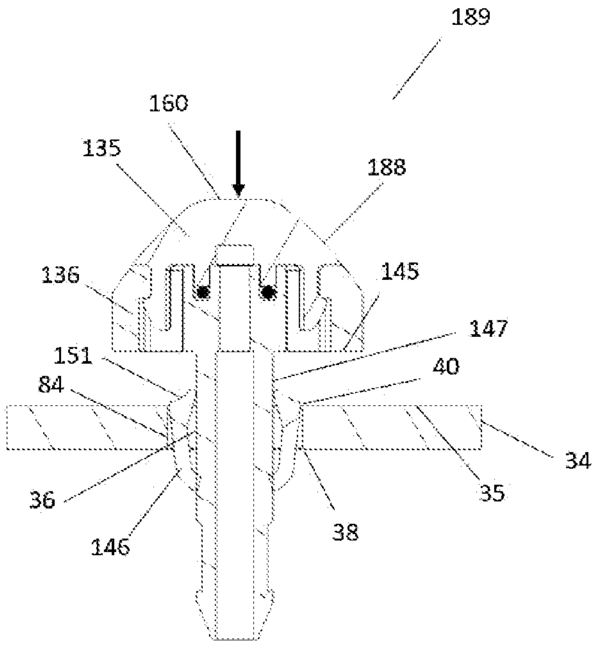
Figure 78A:
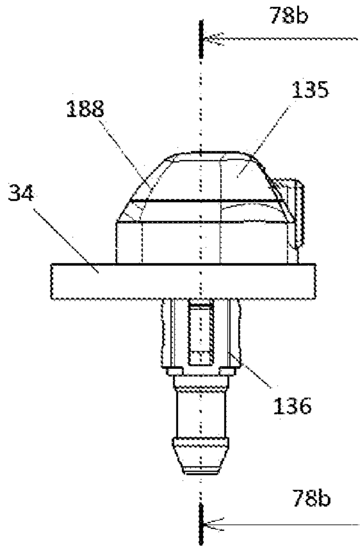
FIG. 78(*a*) shows a right-side view of the spray washer nozzle installation, and FIG. 78(*b*) is a section view taken along line 78(*b*)-78(*b*) in FIG. 78(*a*).
Figure 78B:
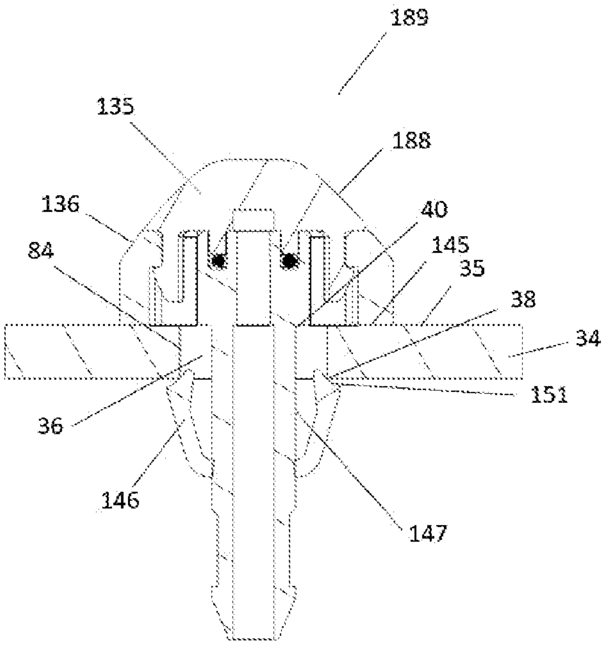
Figure 79:
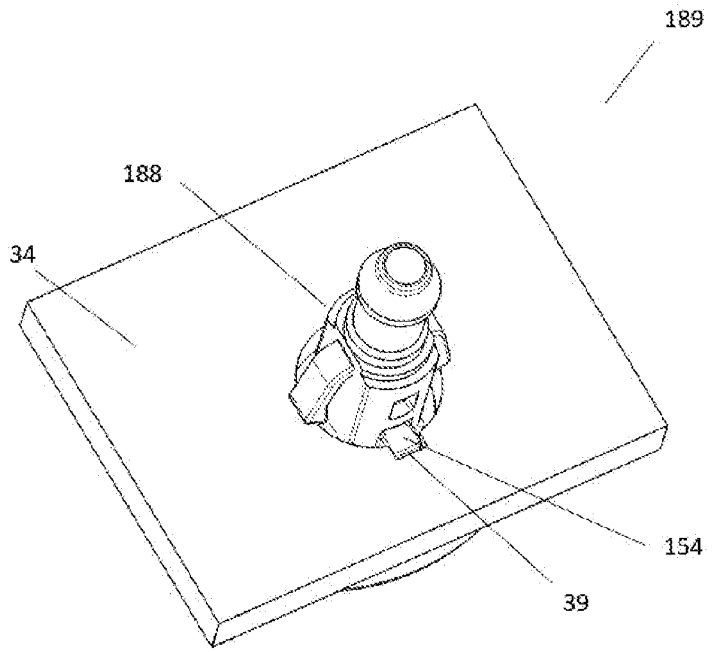
FIG. 79 shows a bottom isometric view of the spray washer nozzle installation.

FIG. 72 through FIG. 74(*b*) show the assembly of the spray washer nozzle 188. The retaining clips 161 on the upper housing 135 are placed into the clip retaining slots 142 in the lower housing 136 with the locator pin 169 of the upper housing 135 aligned with the locator slot 153 in the lower housing 136. Next, pressure is applied to the top surface 160 on the upper housing 135 forcing the retaining clips 161 into the clip retaining slots 142 in the lower housing 136. The tapered surfaces 165 at the end of the retaining clip 161 flex inward to conform to the clip retaining slots 142 until the tapered surfaces 165 move past the retention surfaces 157 in the center of the retaining clip slots 142 at which time the retaining clips 161 flex back to their original position catching the retaining surfaces 166 of the retaining clips 161 under the retention surface 157 of the lower housing 136.

Simultaneously, as the force is applied to the top surface 160 of the upper housing 135, the seal rib 164 on the bottom surface 163 of the upper housing 135 contacts the surface of the seal 138 pressing it farther down into the seal slot 152 until the seal 138 contacts the seal surface 171 at the bottom of the seal slot 152 compressing it between the upper housing 135 and the lower housing 136. This seals the bottom surface 163 of the upper housing 135 and the top surface 143 of the lower housing 136 creating a fluid tight seal around the fluid port 140. A small gap "W" is maintained between the upper housing 135 and the lower housing 136 where the seal 138 is compressed.

FIG. 75 through FIG. 79 show the process of the spray washer nozzle installation 189. The nozzle body 147 of the spray washer nozzle 188 is placed into the hole 36 of the vehicle panel 34. Pressure is applied to the top surface 160 of the upper housing 135 forcing the retaining clips 146 to the hole 36. The retaining clips 146 are flex inward by the upper edge 40 of the of hole 36 allowing the nozzle body 147 to pass through the inside surface 84 of hole 36 in the vehicle panel 34. When the bottom surface 145 of the upper housing 135 contacts the top surface 35 of the vehicle panel 34, the retaining clips 146 flex back to their original position catching the tapered surfaces 151 on the bottom edge 38 of hole 36 retaining the spray washer nozzle 188 to the vehicle panel 34.

While pushing the spray washer nozzle 188 through the hole 36 in the vehicle panel 34, the anti-rotation tab 154 on the spray washer nozzle 188 must be aligned with the anti-rotation notch 39 in the vehicle panel 34. This keeps the spray washer nozzle 188 from rotating in the vehicle panel 34 maintaining the fluid flow at its intended target.

While the embodiments of the invention have been explained in detail, the explanation is illustrative, and the invention is limited only by the appended claims.

What is claimed is:

1. A spray washer nozzle comprising:

an upper housing, a lower housing including a head assembled with the upper housing and a nozzle body extending downwardly from the head, the nozzle body having a fluid channel extending therethrough to supply fluid to the upper housing, and retaining clips configured to attach the lower housing to a portion to be installed, a fastening device having fastening clips formed on one the upper housing or the head of the lower housing, and retaining members formed in another of the upper housing or the lower housing and engaging the fastening clips to connect the upper and lower housings together, a nozzle portion arranged in the upper housing and having a plurality of fluid chambers and a fluid exit to spray the fluid passing through the fluid channel and the fluid chambers from the fluid exit, wherein the plurality of fluid chambers includes:

a first fluid chamber; and a second fluid chamber, wherein the first fluid chamber is connected to the second fluid chamber by a fluid channel smaller than either of the first fluid chamber or the second fluid chamber, and a seal arranged between the upper housing and the lower housing to seal therebetween.

2. The spray washer nozzle according to claim 1, wherein the seal has a horseshoe shape with an open end to surround the nozzle portion with the fluid exit at the open end.

3. The spray washer nozzle according to claim 2, wherein the nozzle portion is integrally formed in a bottom portion of the upper housing, and a sealing rib as a part of the seal surrounds the fluid chambers and the fluid exit.

4. The spray washer nozzle according to claim 3, wherein the upper housing further includes a locator pin, and the lower housing further includes a locator slot engaging the locator pin when the upper and lower housings are aligned.

5. The spray washer nozzle according to claim 1, wherein the upper housing includes a side wall extending downwardly from a periphery of the upper housing, the side wall includes the fastening clips each having a flexibility and a clip pocket therein, and the lower housing includes locator tabs each engaging the clip pocket when the upper housing is assembled with the lower housing.

6. The spray washer nozzle according to claim 5, wherein the lower housing further includes a seal flange with a seal extrusion therearound, the side wall covering the seal disposed around the seal extrusion, and another locator tab disposed on the seal flange to locate the upper housing.

7. The spray washer nozzle according to claim 5, wherein the nozzle portion is integrally formed in a lower surface of the upper housing.

8. The spray washer nozzle according to claim 1, wherein the nozzle portion is formed separately from the upper housing and the lower housing and includes a nozzle tube and a nozzle socket, the upper housing having a notch so that the nozzle portion is disposed above the lower housing and placed in the notch.

9. The spray washer nozzle according to claim 1, wherein the nozzle portion is formed separately from the upper housing, the upper housing having an upper notch, and the lower housing having a lower notch facing the upper notch, the nozzle portion being located in the upper notch and the lower notch.

10. The spray washer nozzle according to claim 9, wherein the nozzle portion includes a body having the plurality of fluid chambers and the fluid exit, and a socket attached to the body.

11. A spray washer nozzle comprising:

an upper housing, a lower housing including a head assembled with the upper housing and a nozzle body extending downwardly from the head, the nozzle body having a fluid channel extending therethrough to supply fluid to the upper housing, and retaining clips configured to attach the lower housing to a portion to be installed, a fastening device having fastening clips formed on one the upper housing or the head of the lower housing, and retaining members formed in another of the upper housing or the lower housing and engaging the fastening clips to connect the upper and lower housings together, a nozzle portion arranged in the upper housing and having a plurality of fluid chambers and a fluid exit to spray the fluid passing through the fluid channel and the fluid chambers from the fluid exit, and a seal arranged between the upper housing and the lower housing to seal therebetween, wherein the seal has a horseshoe shape with an open end to surround the nozzle portion with the fluid exit at the open end.

12. The spray washer nozzle according to claim 11, wherein the nozzle portion is integrally formed in a bottom portion of the upper housing, and a sealing rib as a part of the seal surrounds the fluid chambers and the fluid exit.

13. The spray washer nozzle according to claim 12, wherein the upper housing further includes a locator pin, and the lower housing further includes a locator slot engaging the locator pin when the upper and lower housings are aligned.

* * * * *